US012691682B2

(12) United States Patent
Toyofuku

(10) Patent No.: US 12,691,682 B2
(45) Date of Patent: Jul. 28, 2026

(54) INFORMATION PROCESSING APPARATUS

(71) Applicant: SEIKO EPSON CORPORATION, Tokyo (JP)

(72) Inventor: Atsushi Toyofuku, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 145 days.

(21) Appl. No.: 18/768,144

(22) Filed: Jul. 10, 2024

(65) Prior Publication Data

US 2025/0018709 A1 Jan. 16, 2025

(30) Foreign Application Priority Data

Jul. 11, 2023 (JP) ................................ 2023-113898

(51) Int. Cl.
*B41J 2/045* (2006.01)

(52) U.S. Cl.
CPC ................................ *B41J 2/04588* (2013.01)

(58) Field of Classification Search
None
See application file for complete search history.

(56) References Cited

U.S. PATENT DOCUMENTS

2017/0039306 A1 2/2017 Muto et al.
2021/0373519 A1* 12/2021 Risbeck ............... G05B 19/042
2022/0101213 A1* 3/2022 Mizobe .............. G05B 13/0245
2022/0133583 A1* 5/2022 Best ..................... A61N 1/0476 601/17
2022/0153022 A1 5/2022 Toyofuku et al.
2022/0180146 A1* 6/2022 Saxena .................. G06N 3/006
2022/0305776 A1 9/2022 Toyofuku et al.
2023/0211603 A1 7/2023 Murayama
2023/0211604 A1 7/2023 Murayama
2023/0211605 A1 7/2023 Murayama

FOREIGN PATENT DOCUMENTS

JP 2022-152241 A 10/2022

OTHER PUBLICATIONS

MATLAB Documentation on Slider UI Element, feature added to MATLAB in 2016 in update R2016a as noted on p. 9 of the reference. (Year: 2016).

* cited by examiner

*Primary Examiner* — Scott A Richmond
(74) *Attorney, Agent, or Firm* — Harness, Dickey & Pierce, P.L.C.

(57) ABSTRACT

Provided is an information processing apparatus used in order to determine a drive waveform to be applied to a liquid ejection head, including: an acquisition unit that acquires a plurality of pieces of information being different from one another in terms of each of a plurality of candidates for the drive waveform; and a first display unit that performs display corresponding to the candidates for the drive waveform while associating first evaluation information out of the plurality of pieces of information with a first axis and associating second evaluation information out of the plurality of pieces of information with a second axis intersecting with the first axis, respectively, and further displays Pareto optimal solution information concerning Pareto optimal solutions of first Pareto variable information and second Pareto variable information.

10 Claims, 22 Drawing Sheets

INFORMATION PROCESSING APPARATUS

The present application is based on, and claims priority from JP Application Serial Number 2023-113898, filed Jul. 11, 2023, the disclosure of which is hereby incorporated by reference herein in its entirety.

BACKGROUND

1. Technical Field

The present disclosure relates to an information processing apparatus.

2. Related Art

Generally, in a liquid ejection apparatus such as an ink jet type printer, a liquid such as an ink is ejected from a nozzle by applying a drive pulse to a drive element such as a piezoelectric element. Here, a waveform of the drive pulse is determined in such a way that an ejection performance of the ink from the nozzle achieves a desired performance.

For example, JP-A-2022-152241 discloses a technique for searching for a drive waveform by carrying out multi-objective optimization while using multiple parameters of candidates for drive waveforms as variables.

A preferable candidate for the drive waveform is available according to JP-A-2022-152241. However, according to this technique, it is not possible to learn as to which kinds of characteristic data are obtained from the respective candidates for the drive waveform in the searching process even though such data are supposed to be valuable resources.

SUMMARY

An aspect according to an information processing apparatus of the present disclosure to solve the above-described problem is an information processing apparatus used in order to determine a drive waveform to be applied to a liquid ejection head, including: an acquisition unit that acquires a plurality of pieces of information being different from one another in terms of each of a plurality of candidates for the drive waveform; and a first display unit that performs display corresponding to the candidates for the drive waveform while associating first evaluation information out of the plurality of pieces of information with a first axis and associating second evaluation information out of the plurality of pieces of information with a second axis intersecting with the first axis, respectively, and further displays Pareto optimal solution information concerning Pareto optimal solutions of first Pareto variable information and second Pareto variable information.

DESCRIPTION OF EMBODIMENTS

Figure 1:
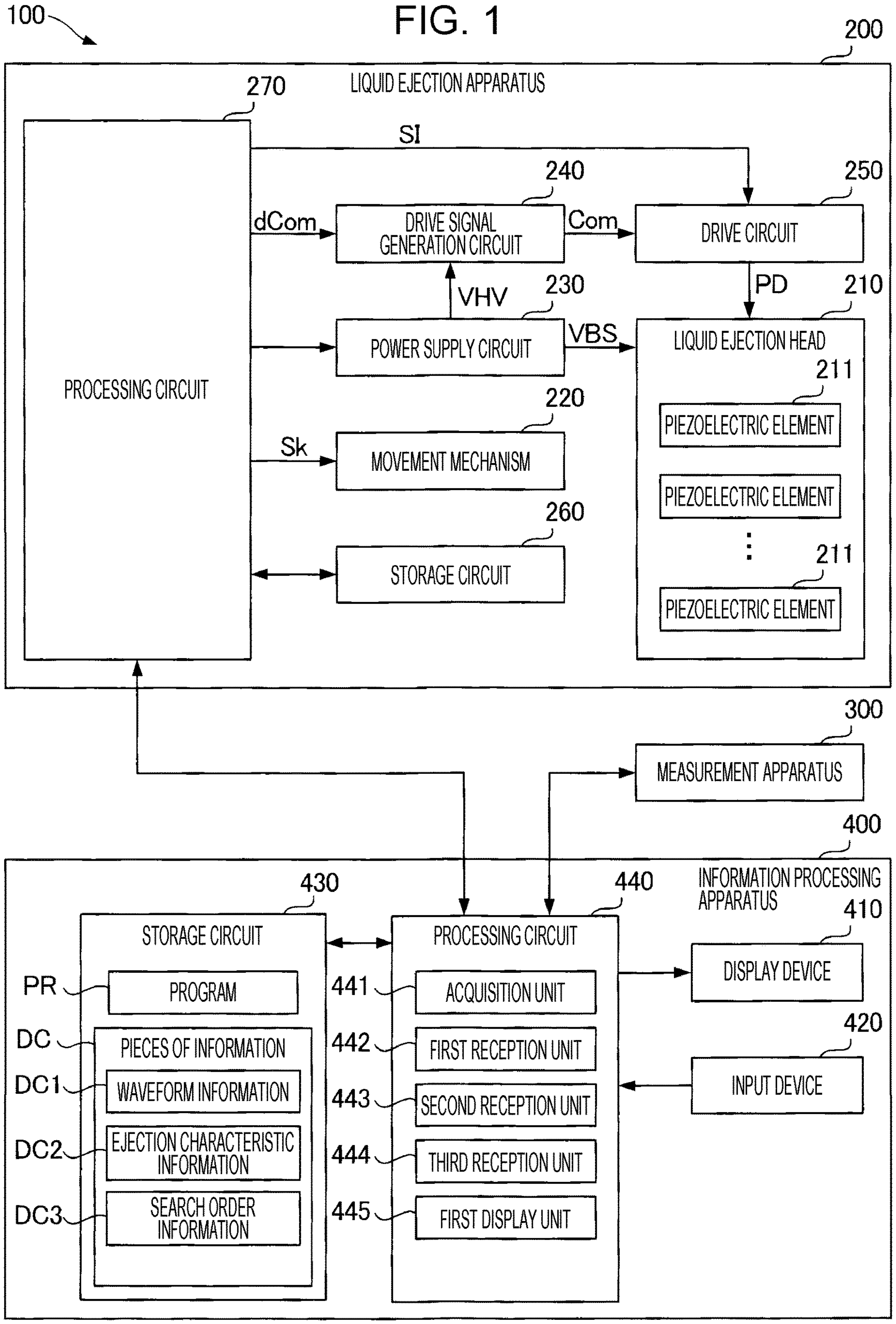
FIG. 1 is a schematic diagram illustrating a configuration example of a system including an information processing apparatus according to a first embodiment.

Preferred embodiments of the present disclosure will be described below with reference to the accompanying drawings. It is to be noted that dimensions and scales of respective portions in the drawings are appropriately different from the reality and that there are also portions that are schematically illustrated in order to facilitate understanding. Moreover, the scope of the present disclosure is not limited to these aspects unless there is a particular statement of restriction of the present disclosure in the following description.

1. First Embodiment

1-1. Outline of System Including Information Processing Apparatus

FIG. 1 is a schematic diagram illustrating a configuration example of a system 100 including an information processing apparatus 400 according to a first embodiment. The system 100 determines or evaluates a drive waveform PD used in the course of ejecting an ink that represents an example of a liquid.

As illustrated in FIG. 1, the system 100 includes a liquid ejection apparatus 200, a measurement apparatus 300, and the information processing apparatus 400. These constituents will be sequentially described below based on FIG. 1.

1-1a. Liquid Ejection Apparatus

The liquid ejection apparatus 200 is a printer that prints on a print medium in accordance with an ink jet method. The print medium only needs to be medium printable with the liquid ejection apparatus 200 and is not limited to a particular medium. Examples of the print medium include a variety of paper, a variety of cloth, various films, and the like. Note that the liquid ejection apparatus 200 may be a serial type printer or a line type printer.

As illustrated in FIG. 1, the liquid ejection apparatus 200 includes a liquid ejection head 210, a movement mechanism 220, a power supply circuit 230, a drive signal generation circuit 240, a drive circuit 250, a storage circuit 260, and a processing circuit 270.

The liquid ejection head 210 ejects the ink toward the print medium. FIG. 1 illustrates piezoelectric elements 211 serving as constituents of the liquid ejection head 210. Although not illustrated, the liquid ejection head 210 includes cavities for holding the ink and nozzles communicating with the cavities besides the piezoelectric elements 211. Here, the piezoelectric element 211 is provided to each cavity so as to eject the ink from the nozzle corresponding to the cavity by changing a pressure in the cavity. Here, a heater to heat the ink inside the cavity may be used as a drive element instead of the piezoelectric element 211.

In the example illustrated in FIG. 1, the number of the liquid ejection heads 210 included in the liquid ejection apparatus 200 is one. However, this number may be two or more. In this case, two or more liquid ejection heads 210 are unitized. When the liquid ejection apparatus 200 is of the serial type, either the liquid ejection head 210 or a unit including two or more liquid ejection heads 210 is used such that multiple nozzles spread across a portion in a width direction of the print medium. Meanwhile, when the liquid ejection apparatus 200 is of the line type, a unit including two or more liquid ejection heads 210 is used such that multiple nozzles spread across the entire region in the width direction of the print medium.

The movement mechanism 220 changes a relative position between the liquid ejection head 210 and the print medium. To be more precise, when the liquid ejection apparatus 200 is of the serial type, the movement mechanism 220 is provided with a transportation mechanism that transports the print medium in a predetermined direction, and a movement mechanism that iteratively moves the liquid ejection head 210 along an axis being orthogonal to the direction of transportation of the print medium. Meanwhile, when the liquid ejection apparatus 200 is of the line type, the movement mechanism 220 is provided with the transportation mechanism that transports the print medium in a direction intersecting with a longitudinal direction of the unit including two or more liquid ejection heads 210.

The power supply circuit 230 receives power supply from a not-illustrated commercial power source and generates prescribed various electric potentials. The various electric potentials thus generated are supplied to respective portions of the liquid ejection apparatus 200 as appropriate. For example, the power supply circuit 230 generates a power supply electric potential VHV and an offset electric potential VBS. The offset electric potential VBS is supplied to the liquid ejection head 210 and the like. Meanwhile, the power supply electric potential VHV is supplied to the drive signal generation circuit 240 and the like.

The drive signal generation circuit 240 is a circuit that generates a drive signal Com for driving each piezoelectric element 211 included in the liquid ejection head 210. To be more precise, the drive signal generation circuit 240 includes a DA conversion circuit and an amplification circuit, for example. The drive signal generation circuit 240 generates the drive signal Com by causing the DA conversion circuit to convert an after-mentioned waveform designation signal dCom from the processing circuit 270 from a digital signal into an analog signal, and causing the amplification circuit to amplify the analog signal by using the power supply electric potential VHV from the power supply circuit 230. The drive signal Com includes a drive waveform PD which is a voltage waveform. Note that the drive waveform PD will be described later in detail.

The drive circuit 250 is a circuit including a group of switches configured to switch whether or not to supply the drive waveform PD included in the drive signal Com to each of the piezoelectric elements 211 based on a control signal SI to be described later.

The storage circuit 260 stores various programs to be executed by the processing circuit 270, and various data such as print data to be processed by the processing circuit 270. The storage circuit 260 includes one or both of semiconductor memories, namely, a volatile memory such as a random access memory (RAM) and a non-volatile memory such as a read only memory (ROM), an electrically erasable programmable read only memory (EEPROM), and a programmable ROM (PROM). The print data is supplied from the information processing apparatus 400, for example. Here, the storage circuit 260 may be formed as a portion of the processing circuit 270.

The processing circuit 270 has a function to control operations of respective portions of the liquid ejection apparatus 200 and a function to process the various data. The processing circuit 270 includes one or more processors such as a central processing unit (CPU), for example. Here, the processing circuit 270 may include a programmable logic device such as a field-programmable gate array (FPGA) instead of the CPU or in addition to the CPU.

The processing circuit 270 controls the operations of the respective portions of the liquid ejection apparatus 200 by executing the programs stored in the storage circuit 260. Here, the processing circuit 270 generates signals including control signals Sk, SI, the waveform designation signal dCom, and the like as signals for controlling the operations of the respective portions of the liquid ejection apparatus 200.

The control signal Sk is a signal for controlling the drive of the movement mechanism 220. The control signal SI is a signal for controlling the drive of the drive circuit 250. To be more precise, the control signal SI designates whether or not the drive circuit 250 should supply the drive signal Com from the drive signal generation circuit 240 as the drive waveform PD to the liquid ejection head 210 for each predetermined unit time period. As a consequence of this designation, an amount of ink to be ejected from the liquid ejection head 210 and other factors are designated. The waveform designation signal dCom is a digital signal for defining a waveform of the drive signal Com generated by the drive signal generation circuit 240.

1-1b. Measurement Apparatus 300

The measurement apparatus 300 is an apparatus for measuring an ejection characteristic of the ink from the liquid ejection head 210 when the drive waveform PD is actually used. Examples of the ejection characteristic include an ejection speed, an ejection angle, an amount of ejection, the number and stability of satellites, and so forth. In the following description, the ejection characteristic of the ink from the liquid ejection head 210 may simply be referred to as the "ejection characteristic" as appropriate.

The measurement apparatus 300 of the present embodiment is an imaging apparatus that takes an image of a flying state of the ink ejected from the liquid ejection head 210. To be more precise, the measurement apparatus 300 includes an imaging optical system and an imaging element, for example. The imaging optical system is an optical system that includes at least one imaging lens. The imaging optical system may include various optical elements such as a prism, or may include a zoom lens, a focus lens, and the like. For example, the imaging element is a charge coupled device (CCD) image sensor, a complementary MOS (CMOS) image sensor, and the like. Measurement of the ejection characteristic using an image taken with the measurement apparatus 300 will be described later with reference to FIG. 3.

In the present embodiment, the measurement apparatus 300 takes the image of the flying ink. However, it is also possible to measure the ejection characteristic such as the amount of ejection of the ink from the liquid ejection head 210 based on a result of taking the image of the ink landed on the print medium and the like. Meanwhile, the measurement apparatus 300 only needs to be capable of obtaining the measurement result corresponding to the ejection characteristic of the ink from the liquid ejection head 210. In this regard, the measurement apparatus 300 does not always have to be the imaging apparatus. For example, the measurement apparatus 300 may be a device such as an electronic balance that measures a mass of the ink ejected from the liquid ejection head 210, for example. Moreover, besides information from the measurement apparatus 300, a result of detection of a waveform of residual vibration generated in the liquid ejection head 210 may also be used as an information source for measuring the ejection characteristic of the ink from the liquid ejection head 210. The residual vibration is vibration that remains on a flow channel of the ink in the liquid ejection head 210 after driving the piezoelectric element 211, which is detected as a voltage signal from the piezoelectric element 211, for example. Here, the ejection characteristic only needs to be a characteristic concerning the state of ejection of the ink from the liquid ejection head 210, which is the concept including a drive frequency and the like of the liquid ejection head 210 in addition to the aforementioned characteristic.

1-1c. Information Processing Apparatus

The information processing apparatus 400 is a computer that controls operations of the liquid ejection apparatus 200 and the measurement apparatus 300. Here, the information processing apparatus 400 is connected either wirelessly or by wire to each of the liquid ejection apparatus 200 and the measurement apparatus 300 in such a way as to be communicable with each other. Here, a communication network including the Internet may mediate this connection.

The information processing apparatus 400 is used for determining the drive waveform PD to be applied to the liquid ejection head 210. The determination of the drive waveform PD is carried out, for example, by driving the liquid ejection head 210 while sequentially using candidates for the drive waveform PD, causing the measurement apparatus 300 to measure the ejection characteristics at the respective driving operations, and selecting a candidate of which the result of measurement falls within a desirable range. Multiple pieces of information DC are obtained in the course of determination of the drive waveform PD as described above. The pieces of information DC include information concerning waveforms other than the drive waveform PD that is finally determined, which can be useful resources in a case of obtaining the drive waveform PD for obtaining a different ejection characteristic, for instance. Here, the liquid ejection head 210 is driven by using the candidates for the drive waveform PD which are obtained by optimization of the drive waveform PD, and the ejection characteristics thereof are measured with the measurement apparatus 300. However, drive waveforms obtained in accordance with a different method may be used instead.

The information processing apparatus 400 therefore has a function to display the pieces of information DC concerning the drive waveform PD appropriately and selectively in response to input by a user. Here, the information processing apparatus 400 may have a function to determine the drive waveform PD.

As illustrated in FIG. 1, the information processing apparatus 400 includes a display device 410, an input device 420, a storage circuit 430, and a processing circuit 440. These constituents are connected in such a way as to be communicable with one another.

The display device 410 displays various images under control of the processing circuit 440. Here, the display device 410 includes various display panels such as a liquid crystal display panel and an organic electro-luminescence (EL) display panel. Note that the display device 410 may be provided on the outside of the information processing apparatus 400. Alternatively, the display device 410 may be a constituent of the liquid ejection apparatus 200.

The input device 420 is an instrument that receives an operation by the user. For example, the input device 420 includes a pointing device such as a touch pad, a touch panel, and a mouse. Here, the input device 420 may also function as the display device 410 when the input device 420 is provided with the touch panel. Note that the input device 420 may be provided on the outside of the information processing apparatus 400. Alternatively, the input device 420 may be a constituent of the liquid ejection apparatus 200.

The storage circuit 430 is a device that stores various programs to be executed by the processing circuit 440, and various data to be processed by the processing circuit 440. The storage circuit 430 includes a hard disk drive or a semiconductor memory, for example. Here, part or all of the storage circuit 430 may be provided to a storage device, a server, or the like on the outside of the information processing apparatus 400.

Programs PR and the pieces of information DC are stored in the storage circuit 430 of the present embodiment. Here, part or all of the programs PR and the pieces of information DC may be stored in the storage device, the server, or the like on the outside of the information processing apparatus 400.

The programs PR cause the processing circuit 440 to execute a variety of processing for appropriately and selectively displaying the pieces of information DC in response to the input by the user.

The pieces of information DC are pieces of information that are different from one another in terms of each of the candidates for the drive waveform PD. In other words, the pieces of information DC are pieces of information concerning the candidates for the drive waveform PD used in the search for the waveform in the course of determination of the drive waveform PD.

The pieces of information DC include waveform information DC1, ejection characteristic information DC2, and search order information DC3.

The waveform information DC1 includes information indicating waveform components of the candidates for the drive waveform PD as the information DC. Here, the waveform information DC1 indicates the waveform components of each candidate in terms of the candidates for the drive waveform PD. Examples of the waveform components include an intermediate electric potential Vc, a maximum electric potential Vh, first contraction time Pwd1, second contraction time Pwd2, first holding time Pwh1, second holding time Pwh2, first expansion time Pwc1, and the like to be described later. In the present embodiment, the pieces of information DC include information indicating the intermediate electric potential Vc, information indicating the maximum electric potential Vh, information indicating the first contraction time Pwd1, information indicating the second contraction time Pwd2, information indicating the first holding time Pwh1, information indicating the second holding time Pwh2, and information indicating the first expansion time Pwc1 as the information DC of each candidate for the drive waveform PD. Details of these waveform components will be described later based on FIG. 2.

The ejection characteristic information DC2 includes information indicating ejection characteristics when the candidates for the drive waveform PD are applied to the liquid ejection head 210 as the information DC. Here, the ejection characteristic information DC2 indicates the ejection characteristics of each candidate in terms of the candidates for the drive waveform PD. Examples of the ejection characteristics include an ejection amount Iw, an ejection speed Vm, and the like to be described later. In the present embodiment, the pieces of information DC include information indicating the ejection amount Iw and information indicating the ejection speed Vm as the information DC of each candidate for the drive waveform PD. Details of these ejection characteristics will be described later based on FIG. 3.

The search order information DC3 includes information indicating the order of application of the candidates for the drive waveform PD as the information DC. Here, the search order information DC3 indicates the order of each candidate in terms of the candidates for the drive waveform PD. The order is a trial order Iter to be described later, which represents the order of application of the candidates to the liquid ejection head 210 in a series of waveform searches in the course of determination of the drive waveform PD. In the present embodiment, the pieces of information DC include information indicating the trial order Iter of each candidate for the drive waveform PD as the information DC.

The processing circuit 440 is a device that has a function to control the respective portions of the information processing apparatus 400, the liquid ejection apparatus 200, and the measurement apparatus 300, and a function to process the various data. For example, the processing circuit 440 includes a processor such as a central processing unit (CPU). Here, the processing circuit 440 may be formed from a single processor or formed from two or more processors. Alternatively, part or all of the functions of the processing circuit 440 may be implemented by hardware such as a digital signal processor (DSP), an application specific integrated circuit (ASIC), a programmable logic device (PLD), and a field programmable gate array (FPGA).

The processing circuit 440 reads the programs PR out of the storage circuit 430 and executes the programs PR. By executing the programs PR, the processing circuit 440 functions as an acquisition unit 441, a first reception unit 442, a second reception unit 443, a third reception unit 444, and a first display unit 445. As described above, the information processing apparatus 400 includes the acquisition unit 441, the first reception unit 442, the second reception unit 443, the third reception unit 444, and the first display unit 445.

The acquisition unit 441 acquires the pieces of information DC. To be more precise, the acquisition unit 441 receives the pieces of information DC from a not-illustrated external apparatus such as a server, and stores the received pieces of information DC in the storage circuit 430.

The first reception unit 442 receives input by the user regarding association of an arbitrary piece of information DC out of the pieces of information DC with an after-mentioned first axis AX1 and association of another arbitrary piece of information DC out of the pieces of information DC with an after-mentioned second axis AX2 intersecting with the first axis AX1. Here, the piece of information DC to be associated with the first axis AX1 is an example of "first evaluation information" and the piece of information DC to be associated with the second axis AX2 is an example of "second evaluation information". In other words, the first reception unit 442 receives input by the user regarding association of the first evaluation information out of the pieces of information DC with the after-mentioned first axis AX1 and association of the second evaluation information out of the pieces of information DC with the after-mentioned second axis AX2. The piece of the first evaluation information and the piece of the second evaluation information may be the same piece of information DC. However, the piece of the first evaluation information and the piece of the second evaluation information are typically different pieces of information DC from each other.

Meanwhile, the first reception unit 442 can receive input by the user regarding a change of the piece of information DC associated with each of the first axis AX1 and the second axis AX2 with a difference piece of information DC. Here, when the piece of information DC associated as the first evaluation information with the first axis AX1 is changed to a different piece of information DC and associated therewith, the difference piece of information DC is an example of "third evaluation information". In other words, in this case, the first reception unit 442 further receives input by the user regarding an action to switch from the piece of information DC as the first evaluation information to the piece of information DC as the third evaluation information out of the pieces of information DC and to associate the third evaluation information with the first axis AX1. The third evaluation information is the different piece of information DC from the first evaluation information, which is an arbitrary piece of information DC out of the pieces of information DC.

In addition, the first reception unit 442 can receive input by the user regarding exchange of relations of the pieces of information DC associated with the first axis AX1 and the second axis AX2. Here, when relations of the pieces of information DC associated with the first axis AX1 and the second axis AX2 are exchanged, the piece of information DC associated with the first axis AX1 before the exchange is the example of the "first evaluation information" and the piece of information DC associated with the second axis AX2 before the exchange is the example of the "second evaluation information". In other words, in this case, the first reception unit 442 further receives input by the user regarding an action to switch the information to be associated with the first axis AX1 from the first evaluation information to the second evaluation information, and to switch the information to be associated with the second axis AX2 from the second evaluation information to the first evaluation information.

The second reception unit 443 receives input by the user regarding setting of at least a piece of information DC out of the pieces of information DC. Here, a piece of information DC out of the at least the piece of information DC is an example of "first condition information". In other words, the second reception unit 443 receives input by the user regarding the first condition information out of the pieces of information DC. Meanwhile, when setting two pieces of information DC out of the pieces of information DC, one of the two pieces of information DC is an example of the "first condition information" and the other piece of information DC is an example of "second condition information". In other words, in this case, the second reception unit 443 further receives input by the user regarding the second condition information out of the pieces of information DC, which is different from the first condition information.

To be more precise, the second reception unit 443 receives designation of an upper limit and a lower limit regarding the first condition information by the user. Here, the upper limit is an upper limit of the piece of information DC corresponding to the first condition information, and the lower limit is a lower limit of the piece of information DC corresponding to the first condition information. For example, when the first condition information represents the ejection amount Iw, the upper limit is an upper limit of the ejection amount Iw and the lower limit is a lower limit of the ejection amount Iw.

The above-mentioned designation of the upper limit and the lower limit regarding the first condition information is carried out by using a slider displayed in an after-mentioned image GU. In other words, the second reception unit 443 receives the designation of conditions by the user regarding the first condition information by using the slider. Here, as will be described later, the second reception unit 443 receives the designation by the user in such a way as to change both the upper limit and the lower limit regarding the first condition information in an interlocking manner while fixing a difference between the upper limit and the lower limit.

The third reception unit 444 receives selection by the user as to whether or not to display Pareto optimal solution information on the first display unit 445. Meanwhile, the third reception unit 444 receives selection by the user as to whether a large value or a small value indicated by the first evaluation information is set to an objective in the course of obtaining a Pareto optimal solution.

The first display unit 445 controls operations of the display device 410 based on results of reception by the first reception unit 442 and the second reception unit 443. To be more precise, the first display unit 445 performs display corresponding to the candidates for the drive waveform PD in a state of associating an arbitrary piece of information DC out of the pieces of information DC with the after-mentioned first axis AX1 and associating another arbitrary piece of information DC out of the pieces of information DC with the after-mentioned second axis AX2 intersecting with the first axis AX1. Accordingly, the first display unit 445 performs display corresponding to the candidates for the drive waveform PD while associating the first evaluation information with the first axis AX1 and associating the second evaluation information with the second axis AX2, for example.

Here, when setting the first condition information, the first display unit 445 performs display corresponding to the candidates for the drive waveform PD that satisfy the condition indicated by the first condition information while associating the first evaluation information out of the pieces of information DC with the first axis AX1 and associating the second evaluation information out of the pieces of information DC with the second axis AX2 intersecting with the first axis AX1, respectively.

Meanwhile, the first display unit 445 switches the first evaluation information and the second evaluation information to be displayed following the input by the user to the second reception unit 443 regarding the first condition information. In other words, the first display unit 445 changes the display of the first evaluation information and the second evaluation information following the input by the user to the second reception unit 443 regarding the first condition information.

Moreover, when setting the first condition information and the second condition information, the first display unit 445 performs display corresponding to the candidates for the drive waveform PD that satisfy both the condition indicated by the first condition information and the condition indicated by the second condition information.

In the meantime, the first display unit 445 can additionally display the Pareto optimal solution information concerning the Pareto optimal solutions of the first evaluation information and the second evaluation information. In other words, the first display unit 445 performs display corresponding to the candidates for the drive waveform PD while associating the first evaluation information out of the pieces of information DC with the first axis AX1 and associating the second evaluation information out of the pieces of information DC with the second axis AX2 intersecting with the first axis AX1. Moreover, the first display unit 445 displays the Pareto optimal solution information concerning the Pareto optimal solutions of the first evaluation information and the second evaluation information.

Here, the first display unit 445 performs display as the Pareto optimal solution information such that a plot representing the Pareto optimal solution out of plots indicating the candidates for the drive waveform PD is distinguishable from other plots.

Meanwhile, the first display unit 445 displays a line corresponding to the Pareto optimal solutions out of the plots indicating the candidates for the drive waveform PD as the Pareto optimal solution information.

Moreover, the first display unit 445 switches the Pareto optimal solution information to be displayed following the input to the second reception unit 443 by the user regarding the first condition information. In other words, the first display unit 445 changes the display of the Pareto optimal solution information following the input to the second reception unit 443 by the user regarding the first condition information.

1-2. Drive Waveform

Figure 2:
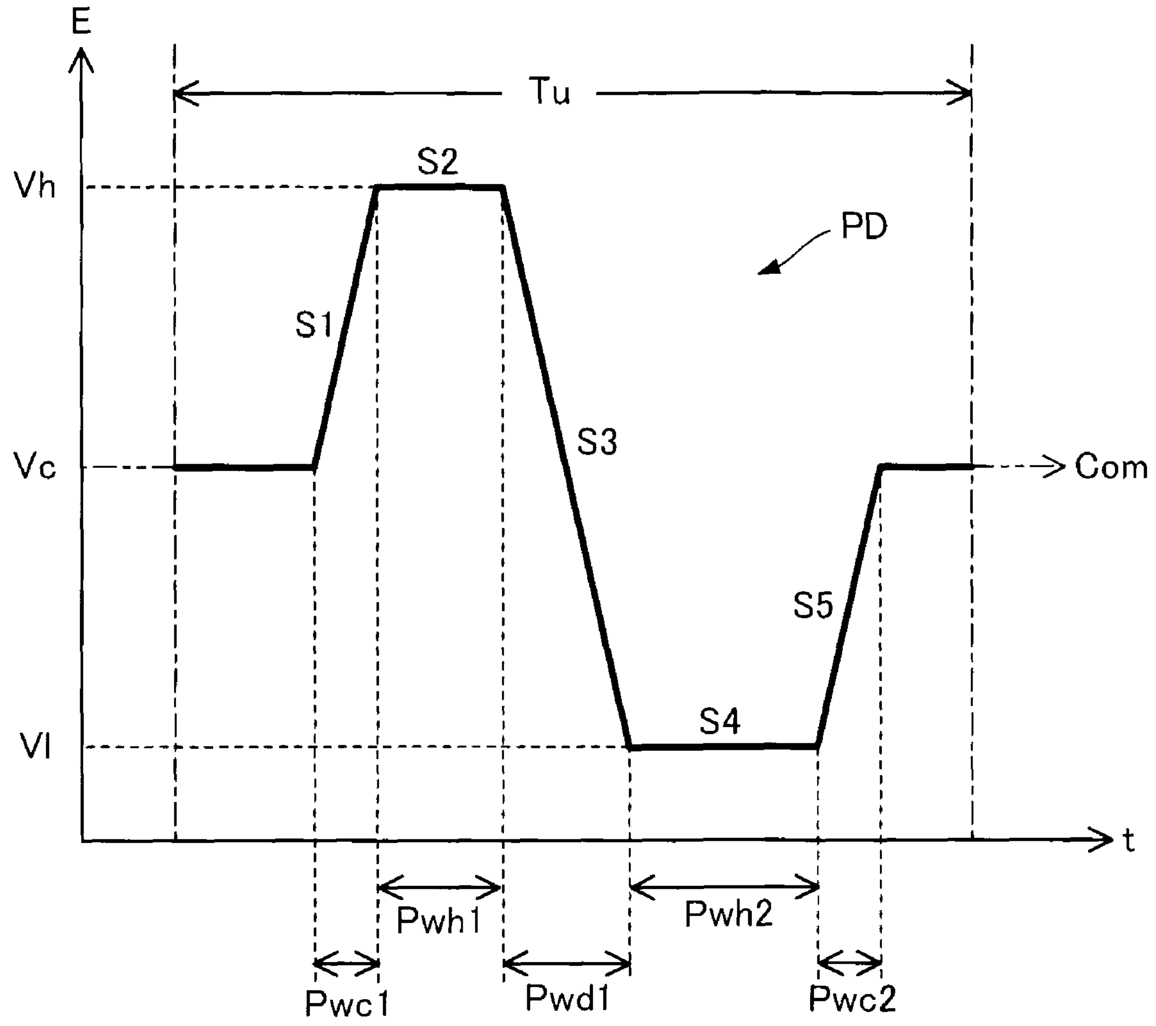
FIG. 2 is a diagram illustrating an example of a drive waveform.

FIG. 2 is a diagram illustrating an example of the drive waveform PD. FIG. 2 illustrates a change in electric potential of the drive waveform PD over time, that is, a voltage waveform of the drive waveform PD. Note that the drive waveform PD is not limited to the example illustrated in FIG. 2 and may take an arbitrary form.

As illustrated in FIG. 2, the drive waveform PD is included in the drive signal Com for each unit time period Tu. The drive waveform PD includes a first expansion element S1, a first holding element S2, a contraction element S3, a second holding element S4, and a second expansion element S5 in this order.

The first expansion element S1 is an element that increases the electric potential from the intermediate electric potential Vc to the maximum electric potential Vh. The first holding element S2 is an element that holds the electric potential at the maximum electric potential Vh. The contraction element S3 is an element that decreases the electric potential from the maximum electric potential Vh to a minimum electric potential Vl. The second holding element S4 is an element that holds the electric potential at the minimum electric potential Vl. The second expansion element S5 is an element that increases the electric potential from the minimum electric potential Vl to the intermediate electric potential Vc.

When the first expansion element S1 is applied to the piezoelectric element 211 from a state of applying the intermediate electric potential Vc to the piezoelectric element 211, a volume of a pressure chamber of the liquid ejection head 210 is increased from a reference state. Then, as the first holding element S2 is applied to the piezoelectric element 211, the state of increase in volume of the pressure chamber is maintained. Subsequently, when the contraction element S3 is applied to the piezoelectric element 211, the volume of the pressure chamber is rapidly contracted. As a consequence, an ink pressure inside the pressure chamber is increased and ink droplets are ejected from the nozzle communicating with the pressure chamber. Thereafter, when the second holding element S4 is applied to the piezoelectric element 211, the contracted state of the volume of the pressure chamber is maintained. Subsequently, when the second expansion element S5 is applied to the piezoelectric element 211, the volume of the pressure chamber returns to the reference state.

Here, a length of time of the first expansion element S1 is the first expansion time Pwc1. A length of time of the first holding element S2 is the first holding time Pwh1. A length of time of the contraction element S3 is the first contraction time Pwd1. A length of time of the second holding element S4 is the second holding time Pwh2. A length of time of the second expansion element S5 is second expansion time Pwc2. Here, when there is another contraction element to decrease the electric potential after the contraction element S3 in the unit time period Tu, a length of time of such a contraction element is the second contraction time Pwd2 to be described later.

Values of the first expansion time Pwc1, the first holding time Pwh1, the first contraction time Pwd1, the second holding time Pwh2, and the second expansion time Pwc2 mentioned above are parameters to define a shape of the drive waveform PD. Accordingly, by changing these parameters, it is possible to adjust the drive waveform PD so as to obtain desired ejection characteristics.

1-3. Measurement of Ink Ejection Characteristics

Figure 3:
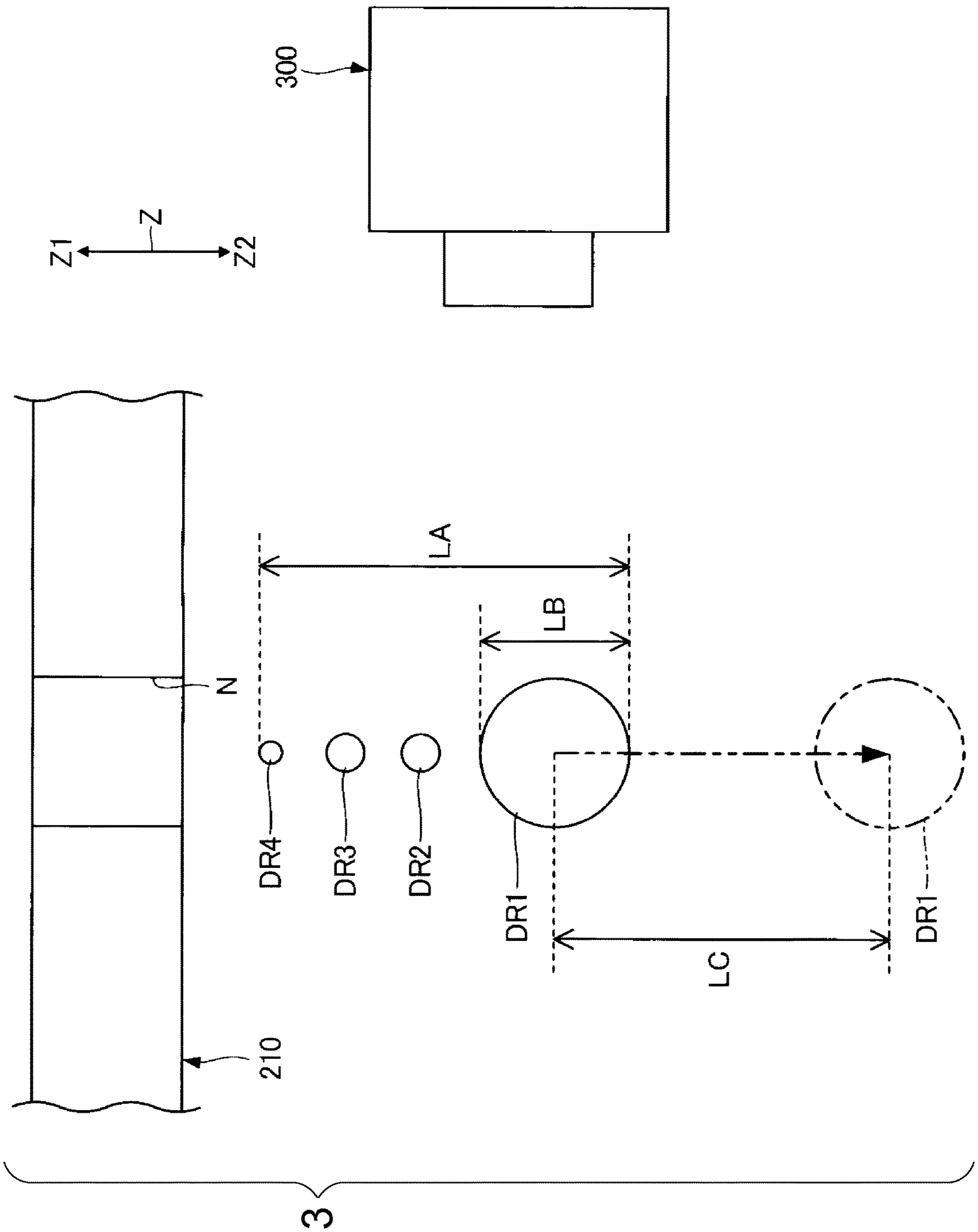
FIG. 3 is a diagram for explaining measurement of ink ejection characteristics.

FIG. 3 is a diagram for explaining the measurement of ink ejection characteristics. As illustrated in FIG. 3, the measurement apparatus 300 of the present embodiment take images of flying states of liquid droplets DR1, DR2, DR3, and DR4 of the ink ejected from a nozzle N of the liquid ejection head 210 in a direction orthogonal to or intersecting with a direction of ejection.

The liquid droplet DR1 is a main liquid droplet. On the other hand, the liquid droplets DR2, DR3, and DR4 are each a liquid droplet called a satellite having a smaller diameter than that of the liquid droplet DR1, which are generated subsequently to the liquid droplet DR1 in association with generation of the liquid droplet DR1. Note that the presence or absence of the liquid droplets DR2, DR3, and DR4 as well as the number, the sizes, and other features thereof vary depending on the aforementioned drive waveform PD.

The ejection amount Iw representing the amount of the ink in each ejecting action from the liquid ejection head 210 is calculated based on a diameter LB of the main liquid droplet DR1 by using the image taken with the measurement apparatus 300, for example. Meanwhile, the after-mentioned ejection speed Vm that represents an ejection speed of the ink from the liquid ejection head 210 is obtained by serially taking images of the liquid droplet DR1 and then calculated based on a movement distance LC of the liquid droplet DR1 after a lapse of predetermined time and on the predetermined time, for example. In FIG. 3, the liquid droplet DR1 after the lapse of the predetermined time is illustrated with a chain double-dashed line. Alternatively, an aspect ratio (LA/LB) of the ink from the liquid ejection head 210 can also be calculated as the ejection characteristic of the ink. It is also possible to obtain an ejection angle of the ink from the liquid ejection head 210 from a positional relation of the liquid droplet DR1 before and after the lapse of the predetermined time.

1-4. Operation of the Information Processing Apparatus

Figure 4:
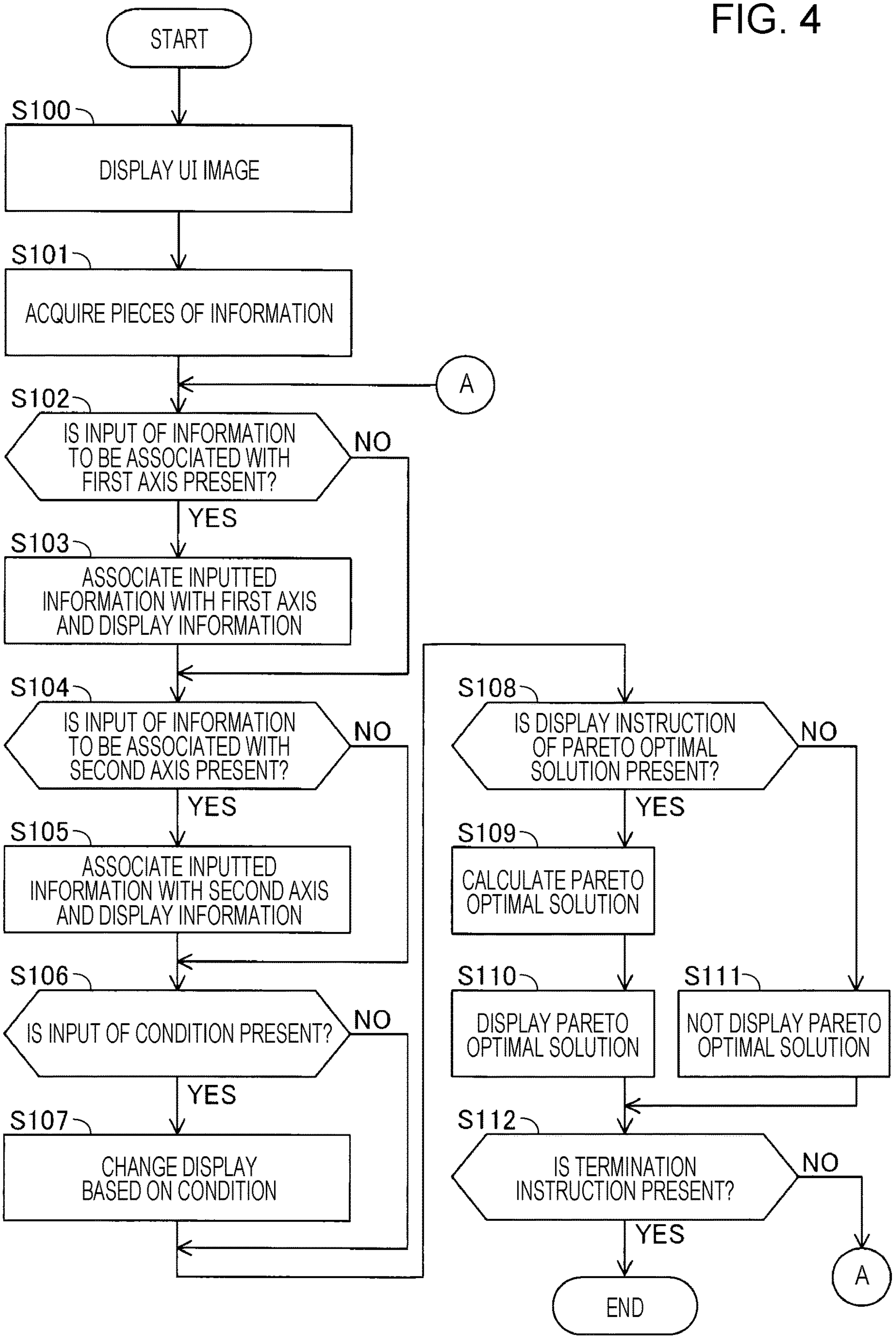
FIG. 4 is a flowchart illustrating an operation of the information processing apparatus according to the first embodiment.

FIG. 4 is a flowchart illustrating an operation of the information processing apparatus 400 according to the first embodiment. As illustrated in FIG. 4, the processing circuit 440 of the information processing apparatus 400 executes the programs PR, thereby causing the display device 410 to display the after-mentioned image GU for a graphical user interface (GUI) to begin with.

Next, the acquisition unit 441 acquires the pieces of information DC in step S101. This acquisition is carried out based on input to the after-mentioned image GU to be displayed on the display device 410, for example.

Next, in step S102, the first reception unit 442 determines the presence or absence of the input of the information DC to be associated with the first axis AX1 to be described later. This determination is carried out based on the presence or absence of input to the after-mentioned image GU to be displayed on the display device 410.

When the input of the information DC to be associated with the first axis AX1 is present (step S102: Yes), the first display unit 445 performs display while associating the inputted information DC with the first axis AX1 in step S103. This display is carried out in the after-mentioned mentioned image GU displayed on the display device 410.

Either after step S103 or when the input of the information DC to be associated with the first axis AX1 is absent (step S102: No), the first reception unit 442 determines the presence or absence of the input of the information DC to be associated with the after-mentioned second axis AX2 in step S104. This determination is carried out based on the presence or absence of input to the after-mentioned image GU to be displayed on the display device 410.

When the input of the information DC to be associated with the second axis AX2 is present (step S104: Yes), the first display unit 445 performs display while associating the inputted information DC with the second axis AX2 in step S105. This display is carried out in the after-mentioned image GU displayed on the display device 410.

Either after step S105 or when the input of the information DC to be associated with the second axis AX2 is absent (step S104: No), the second reception unit 443 determines the presence or absence of the input of the condition of the information DC in step S106. This determination is carried out based on the presence or absence of input to the after-mentioned image GU to be displayed on the display device 410.

When the input of the condition of the information DC is present (step S106: Yes), the first display unit 445 changes display corresponding to the candidates for the drive waveform PD so as to satisfy the inputted condition in step S107.

Either after step S107 or when the input of the condition of the information DC is absent (step S106: No), the third reception unit 444 determines the presence or absence of a display instruction of the Pareto optimal solution regarding the displayed information DC in step S108. This determination is carried out based on the presence or absence of input to the after-mentioned image GU to be displayed on the display device 410.

When the display instruction of the Pareto optimal solution is present (step S108: Yes), the Pareto optimal solution regarding the information DC to be displayed is calculated in step S109, and then the first display unit 445 displays the calculated Pareto optimal solution in step S110.

Meanwhile, when the display instruction of the Pareto optimal solution is absent (step S108: No), the first display unit 445 does not perform the display of the Pareto optimal solution in step S111.

Either after step S110 or after step S111, the first display unit 445 determines the presence or absence of a termination instruction in step S112. This determination is carried out based on the presence or absence of input to the after-mentioned image GU to be displayed on the display device 410, for example.

When the termination instruction is absent (step S112: No), the first display unit 445 returns to the above-described step S102. On the other hand, when the termination instruction is present (step S112: Yes), the first display unit 445 terminates the display of the after-mentioned image GU.

1-5. Display Examples

Figure 5:
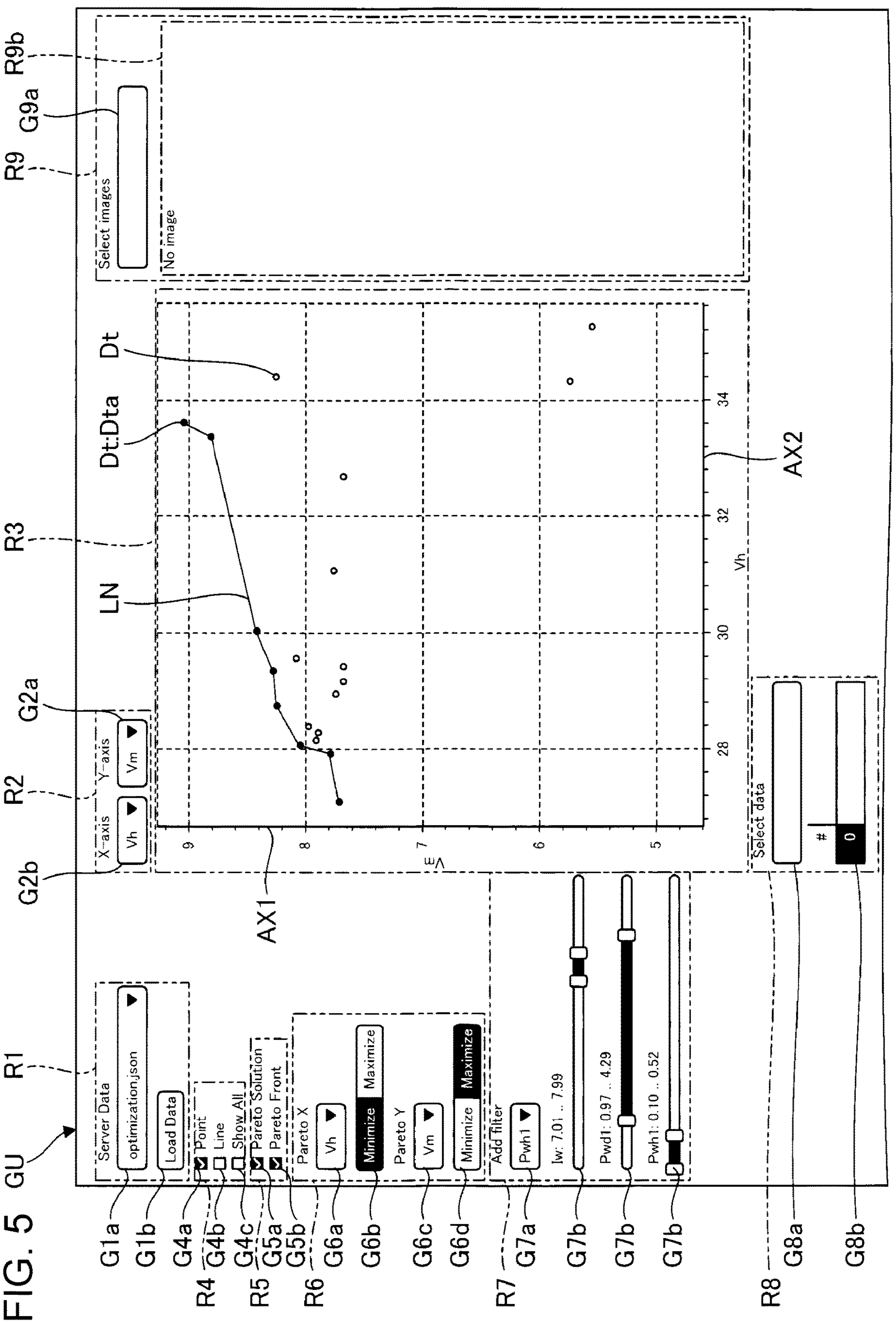
FIG. 5 is a diagram illustrating a display example on the information processing apparatus according to the first embodiment.

FIG. 5 is a diagram illustrating a display example on the information processing apparatus 400 according to the first embodiment. FIG. 5 illustrates the image GU to be displayed on the display device 410 in the course of execution of step S100 to step S112 described above.

As illustrated in FIG. 5, the image GU includes regions R1 to R9. Now, the regions R1 to R9 will be briefly and sequentially described below based on FIG. 5.

The region R1 is a region for receiving the input of the pieces of information DC. In the example illustrated in FIG. 5, the region R1 includes a drop-down list G1*a* and a button G1*b*. The drop-down list G1*a* is an element for selecting the pieces of information DC stored in the external apparatus such as the server. The button G1*b* is an element for receiving an operation to cause the information processing apparatus 400 to read the pieces of information DC selected on the drop-down list G1*a*. In step S101 described above, the acquisition unit 441 acquires the pieces of information DC thus read into the information processing apparatus 400.

The region R2 is a region for selecting the pieces of information DC to be associated with the first axis AX1 and the second axis AX2, respectively. In the example illustrated in FIG. 5, the region R2 includes drop-down lists G2*a* and G2*b*. The drop-down list G2*a* is an element for selecting an arbitrary piece of information DC to be associated with the first axis AX1 out of the read pieces of information DC. In step S102 described above, the first reception unit 442 determines the presence or absence of the input of the information DC to be associated with the first axis AX1 based on a result of selection from the drop-down list G2*a*, and accepts the input of the information DC to be associated with the first axis AX1 when the input is present (step S102: Yes). The drop-down list G2*b* is an element for selecting an arbitrary piece of information DC to be associated with the second axis AX2 out of the read pieces of information DC. In step S104 described above, the first reception unit 442 determines the presence or absence of the input of the information DC to be associated with the second axis AX2 based on a result of selection from the drop-down list G2*b*, and accepts the input of the information DC to be associated with the second axis AX2 when the input is present (step S104: Yes).

The region R3 is a region for performing the display corresponding to the candidates for the drive waveform PD in the state of associating the pieces of information DC with the first axis AX1 and the second axis AX2, respectively. A graph in which the longitudinal axis indicates the first axis AX1 and the lateral axis indicates the second axis AX2 is displayed in the region R3. Here, dots Dt that indicate the candidates for the drive waveform PD are displayed in the region R3 based on the association with the first axis AX1 and the second axis AX2. In Steps S103 and S105 described above, the first display unit 445 displays the dots Dt based on results of input to the regions R2, R4, R5, R6, and R7. Here, when each dot Dt displayed in the region R3 is selected (pointed with a cursor), each piece of evaluation information to be described later in terms of the drive waveform PD corresponding to the dot Dt is displayed. In the example illustrated in FIG. 5, among the dots Dt displayed in the region R3, dots Dta being the dots Dt that represent Pareto optimal solutions of the candidates for the drive waveform PD are displayed in a different mode from that of other dots Dt. Meanwhile, a line LN being a polygonal line obtained by connecting the dots Dta is displayed in the region R3. The line LN indicates Pareto front of the candidates for the drive waveform PD.

The region R4 is a region for selecting a display mode of the candidates for the drive waveform PD in the region R3. In the example illustrated in FIG. 5, the region R4 includes checkboxes G4*a*, G4*b*, and G4*c*. The checkbox G4*a* is an element for selecting whether or not to display the candidates for the drive waveform PD in the form of a scatter plot in the region R3. The aforementioned dots Dt are displayed when this checkbox is selected. The checkbox G4*b* is an element for selecting whether or not to display the candidates for the drive waveform PD in the form of a line plot in the region R3. The checkbox G4*c* is an element for selecting whether or not to display all the candidates for the drive waveform PD in the region R3. When this checkbox is selected, all the candidates are displayed even if the candidates that do not satisfy a condition set in the region R8 to be described later are included. In this case, however, the candidates that do not satisfy the condition set in the region R8 will be displayed in a different mode from that of other candidates in a distinguishable manner.

The region R5 is a region for setting concerning the display of the Pareto optimal solutions of the candidates for the drive waveform PD in the region R3. The third reception unit 444 determines the presence or absence of the display instruction of the Pareto optimal solutions in step S108 described above based on the result of input to the region R5. When the display instruction is present (step S108: Yes), the Pareto optimal solutions are calculated in step S109. In the example illustrated in FIG. 5, the region R5 includes checkboxes G5*a* and G5*b*. The checkbox G5*a* is an element for selecting whether or not to display the Pareto optimal solutions of the candidates for the drive waveform PD in the region R3. The aforementioned dots Dta are displayed when this checkbox is selected. The checkbox G5*b* is an element for selecting whether or not to display the Pareto front of the candidates for the drive waveform PD in the region R3. The above-described line LN is displayed when this checkbox is selected.

The region R6 is a region for setting conditions when the Pareto optimal solutions are displayed in the region R3. In the example illustrated in FIG. 5, the region R6 includes a drop-down list G6*a*, a button G6*b*, a drop-down list G6*c*, and a button G6*d*. The drop-down list G6*a* is an element for setting the information DC associated with the first axis AX1 as a variable of the Pareto optimal solutions. The button G6*b* is an element for selecting whether to maximize or to minimize an objective function of Pareto optimization regarding the variable set in the drop-down list G6*a*. The drop-down list G6*c* is an element for setting the information DC associated with the second axis AX2 as a variable of the Pareto optimal solutions. The button God is an element for selecting whether to maximize or to minimize the objective function of Pareto optimization regarding the variable set in the drop-down list G6*c*.

The region R7 is a region for setting the condition of the candidates for the drive waveform PD to be displayed in the region R3. In step S106 described above, the second reception unit 443 determines the presence or absence of the input of the condition of the information DC based on the result of input to the region R7. In the example illustrated in FIG. 5, the region R6 includes a drop-down list G7*a* and sliders G7*b*. The drop-down list G7*a* is an element for selecting the piece of information DC for setting the condition. Each of the sliders G7*b* is an element for setting an upper limit and a lower limit as the condition of the piece of information DC selected from the drop-down list G7*a*. In the present embodiment, each slider G7*b* comes into being depending on selection of each piece of information DC from the drop-down list G7*a*. In the example illustrated in FIG. 5, three pieces of information DC of the ejection amount Iw, the first contraction time Pwd1, and the first holding time Pwh1 are displayed as the sliders G7*b*. This means that the aforementioned three pieces of information DC have been selected through the drop-down list G7*a* prior to the example illustrated in FIG. 5. Meanwhile, in the present embodiment, each slider G7*b* includes a pair of sliders. Of the pair of sliders, one is a slider for setting the upper limit while the other is a slider for setting the lower limit. Here, on the condition that the upper limit is not the maximum value and the lower limit is not the minimum value, it is possible to move the pair of sliders while retaining a difference between the upper limit and the lower limit by operating a portion between the pair of sliders.

The region R8 is a region for displaying contents of one or more arbitrary pieces of information DC regarding the candidates for the drive waveform PD. In the example illustrated in FIG. 5, the region R8 includes a selection portion G8*a* and a display portion G8*b*. The selection portion G8*a* is an element for selecting the one or more arbitrary pieces of information DC out of the pieces of information DC. The display portion G8*b* is a region for displaying the one or more pieces of information DC selected in the selection portion G8*a* while sorting the pieces of information DC based on the candidates for the drive waveform PD. Usage examples of the region R8 will be described later based on FIG. 13.

The region R9 is a region for displaying the contents of the one or more arbitrary pieces of information DC regarding the candidates for the drive waveform PD when the information DC contains any of image data, text data, waveform data, and the like that cannot be displayed in the form of a table or a plot. In the case illustrated in FIG. 5, the region R9 includes a selection portion G9*a* and a display portion G9*b*. The selection portion G9*a* is an element for selecting the one or more arbitrary pieces of information DC out of the pieces of information DC. The display portion G9*b* is a region for displaying any of images, texts, waveforms, and the like representing the one or more pieces of information DC selected in the selection portion G9*a*.

The above-described image GU performs display corresponding to the candidates for the drive waveform PD in the state of associating the pieces of information DC in response to the input by the user with the first axis AX1 and the second axis AX2, respectively. The usage examples of the image GU will be described below based on FIGS. 6 to 19.

Figure 6:
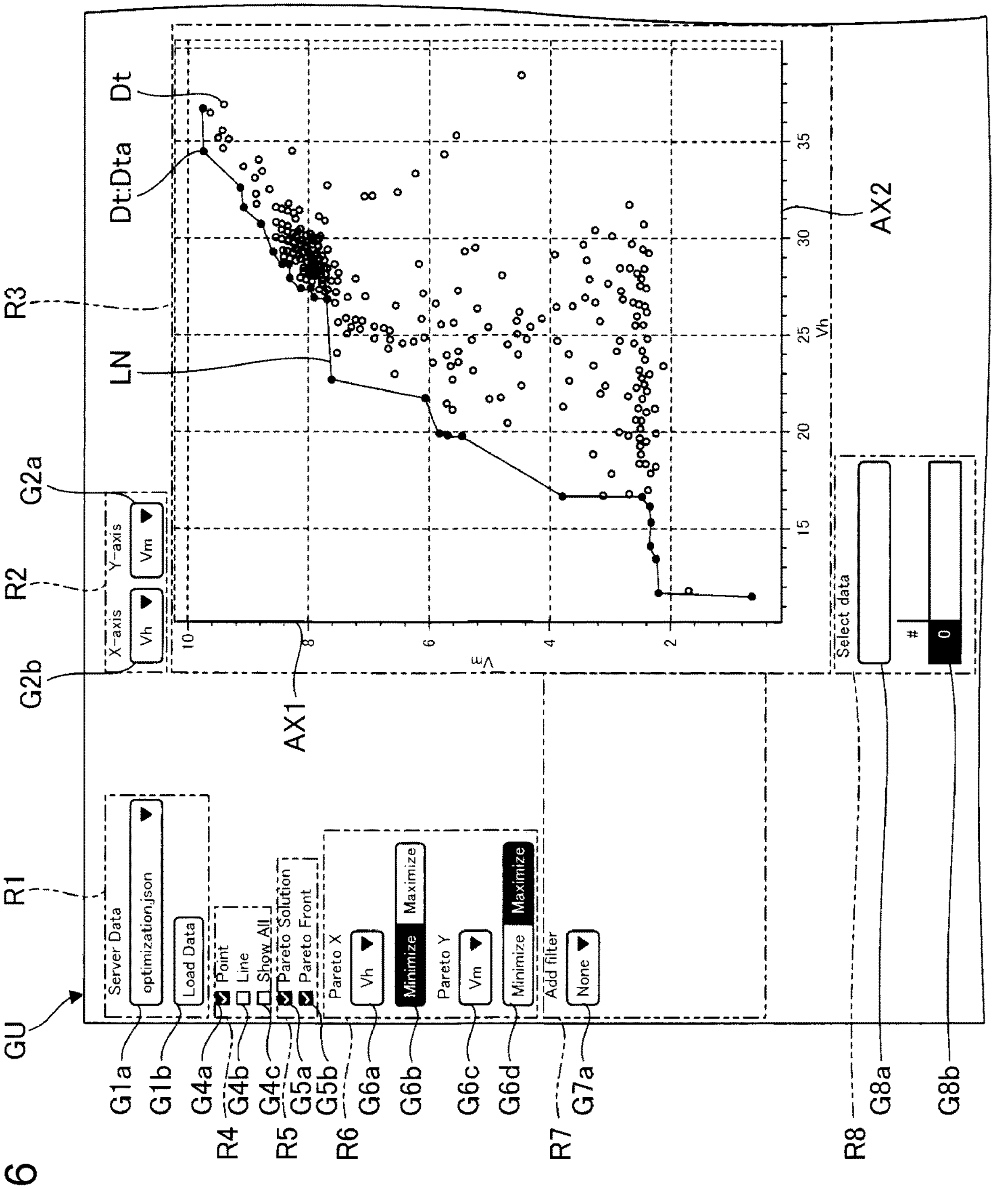
FIG. 6 is a diagram illustrating a display example of first evaluation information and second evaluation information.

FIG. 6 is a diagram illustrating a display example of the first evaluation information and the second evaluation information. FIG. 6 illustrates an example in which the information DC representing the ejection speed Vm as the first evaluation information is associated with the first axis AX1 while the information DC representing the maximum electric potential Vh as the second evaluation information is associated with the second axis AX2.

Here, the information DC representing the ejection speed Vm is selected by using the drop-down list G2*a* in the region R2, and the information DC representing the maximum electric potential Vh is selected by using the drop-down list G2*b* in the region R2. Thus, the first reception unit 442 receives the input by the user regarding association of the information DC representing the ejection speed Vm as the first evaluation information out of the pieces of information DC with the first axis AX1, and association of the information DC representing the maximum electric potential Vh as the second evaluation information out of the pieces of information DC with the second axis AX2.

In the example illustrated in FIG. 6, a graph depicting correlations of the candidates for the drive waveform PD in the state of associating the information DC representing the ejection speed Vm as the first evaluation information with the first axis AX1 and associating the information DC representing the maximum electric potential Vh as the second evaluation information with the second axis AX2 is displayed in the region R3.

Here, in the example illustrated in FIG. 6, only the checkbox G4*a* out of the checkboxes G4*a*, G4*b*, and G4*c* in the region R4 is selected. Accordingly, the dots Dt indicating the relation between the ejection speed Vm and the maximum electric potential Vh of the respective candidates are displayed in the region R3 as the display corresponding to the candidates for the drive waveform PD.

Meanwhile, in the example illustrated in FIG. 6, both the checkboxes G5*a* and G5*b* out of the checkboxes G5*a* and G5*b* in the region R5 are selected. Accordingly, the third reception unit 444 receives the selection by the user as to whether or not to display the Pareto optimal solution information on the first display unit 445. Then, the first display unit 445 displays the Pareto optimal solution information concerning the Pareto optimal solutions of the first evaluation information and the second evaluation information. Here, the dots Dta indicating the Pareto optimal solutions of the candidates for the drive waveform PD are displayed in the region R3 in the distinguishable manner from other dots Dt, and the line LN indicating the Pareto front of the candidates for the drive waveform PD is displayed therein.

As described above, the first display unit 445 displays plots representing the Pareto optimal solutions out of plots indicating the candidates for the drive waveform PD in the distinguishable manner from other dots so as to represent the Pareto optimal solution information. Meanwhile, the first display unit 445 displays the line LN as the line corresponding to the Pareto optimal solutions out of the plots indicating the candidates for the drive waveform PD so as to represent the Pareto optimal solution information. In FIG. 6, the dots Dt are indicated with open dots while the dots Dta are indicated as solid dots for the convenience of illustration.

Moreover, in the example illustrated in FIG. 6, the maximum electric potential Vh is inputted to the drop-down list G6*a*, "minimize" is selected with the button G6*b*, the ejection speed Vm is inputted to the drop-down list G6*c*, and "maximize" is selected with the button G6*d* in the region R6. Accordingly, the third reception unit 444 receives the selection by the user as to whether a large value or a small value indicated by the first evaluation information is set to an objective in the course of obtaining the Pareto optimal solutions. Here, the dots Dta displayed in the region R3 indicate the Pareto optimal solutions that minimize the maximum electric potential Vh and maximize the ejection speed Vm in terms of the objective function that adopts the ejection speed Vm and the maximum electric potential Vh as its variables.

Here, in the example illustrated in FIG. 6, the ejection speed Vm being the same evaluation information is inputted to the drop-down list G2*a* and the drop-down list G6*c*, and the maximum electric potential Vh being the same evaluation information is inputted to the drop-down list G2*b* and the drop-down list G6*a*, respectively. In other words, a combination of the first axis AX1 and the second axis AX2 matches a combination of the two variables of the Pareto optimal solution information. Accordingly, a relation among the dots Dt displayed in the region R3 and the dot Dta as well as the line LN corresponding to the Pareto optimal solution in which the dots Dt on the upper right are selected is clearly displayed. Nonetheless, different pieces of evaluation information may be inputted to the drop-down list G2*a* and the drop-down list G6*c*, and different pieces of evaluation information may be inputted to the drop-down list G2*b* and the drop-down list G6*a*. As in the above-described cases, the information to be inputted to the drop-down list G6*a* and the drop-down list G6*c* may also be referred to as first Pareto variable information and the information to be inputted to the drop-down list G6*a* and the drop-down list G6*c* may also be referred to as first Pareto variable information and second Pareto variable information. In such a case, the dots Dt displayed in the region R3 and the dots Dta as well as the line LN corresponding to the Pareto optimal solutions may possibly be displayed in such a way that a correlation therein is unclear at a glance. However, there may also be a case where the user desires such a display mode.

Note that the input to the regions R7, R8, and R9 is not carried out in the example illustrated in FIG. 6. Accordingly, the dots Dt corresponding to all the candidates for the drive waveform PD are displayed in the region R3 since the input to the region R7 is not carried out. Meanwhile, no data are displayed in the display portion G8*b* in the region R8 since the input to the region R8 is not carried out. No data are displayed in the display portion G9*b* in the region R9 since the input to the region R9 is not carried out.

Figure 7:
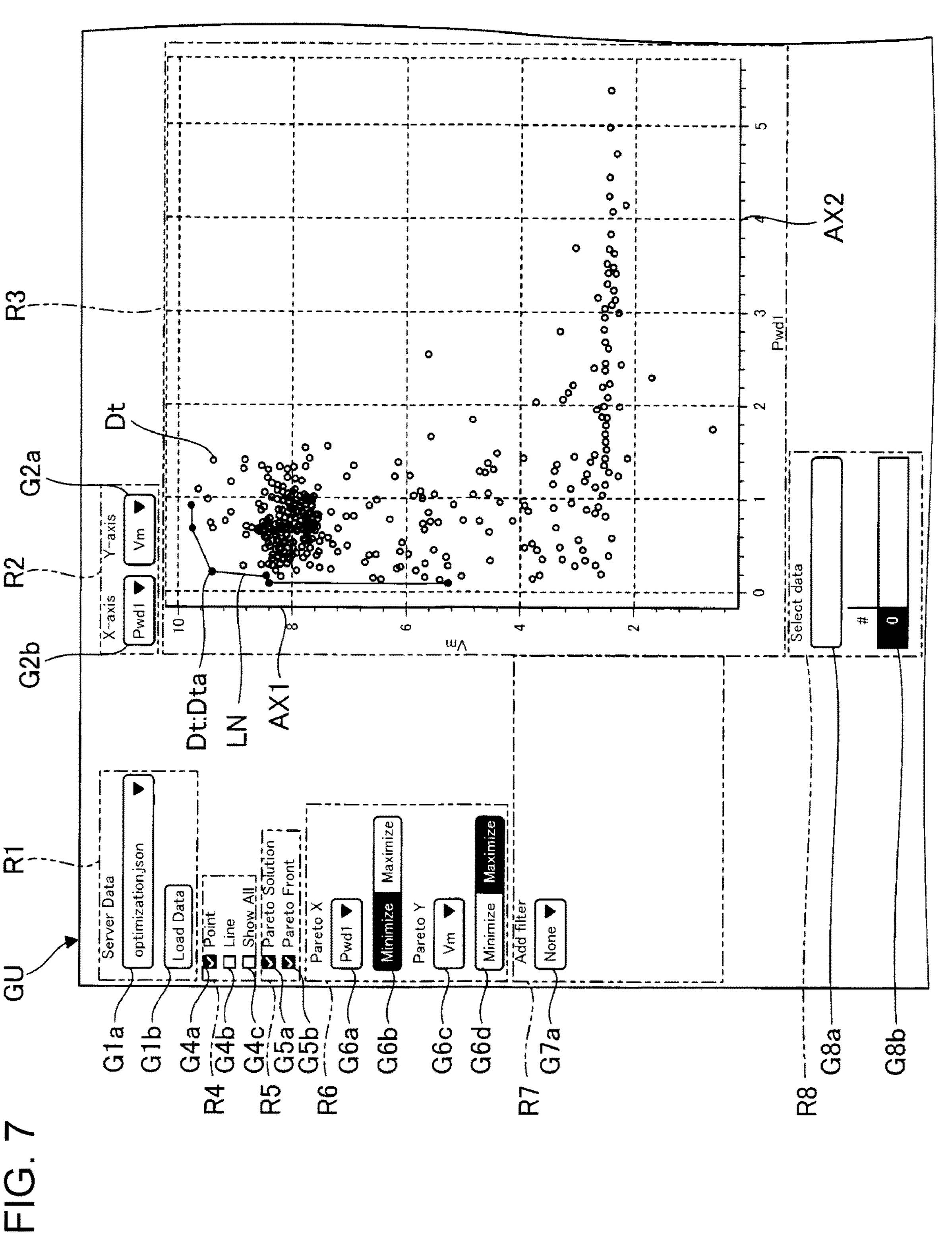
FIG. 7 is a diagram illustrating a display example of the first evaluation information and third evaluation information.

FIG. 7 is a diagram illustrating a display example of the first evaluation information and the third evaluation information. FIG. 7 illustrates an example in which the state of input to the drop-down list G2*b* in the region R2 of the image GU in the above-described state illustrated in FIG. 6 is changed from the maximum electric potential Vh to the first contraction time Pwd1. Specifically, FIG. 7 illustrates an example of a case where the information DC representing the ejection speed Vm is associated as the first evaluation information with the first axis AX1 and the information DC representing the first contraction time Pwd1 is associated as the third evaluation information with the second axis AX2.

Here, the information DC representing the ejection speed Vm is selected by using the drop-down list G2*a* in the region R2, and the information DC representing the first contraction time Pwd1 is selected by using the drop-down list G2*b* in the region R2. In this way, the first reception unit 442 further receives the input by the user regarding switching from the information DC as the second evaluation information to the information DC as the third evaluation information out of the pieces of information DC and association of the third evaluation information with the second axis AX2.

In the example illustrated in FIG. 7, a graph depicting correlations of the candidates for the drive waveform PD in the state of associating the information DC representing the ejection speed Vm as the first evaluation information with the first axis AX1 and associating the information DC representing the first contraction time Pwd1 as the third evaluation information with the second axis AX2 is displayed in the region R3.

Here, in the example illustrated in FIG. 7, the states of input to the regions R4, R5, R6, R7, R8, and R9 are the same as those in the above-described example illustrated in FIG. 6.

As described above, it is possible to change the information DC to be associated with the second axis AX2. Here, FIG. 7 illustrates the example of the aspect of changing the information DC to be associated with the second axis AX2. Instead, in a case of changing the state of input to the drop-down list G2*a* in the region R2 of the image GU in the state illustrated in FIG. 6, the information DC after the change is associated as the third evaluation information with the first axis AX1.

Figure 8:
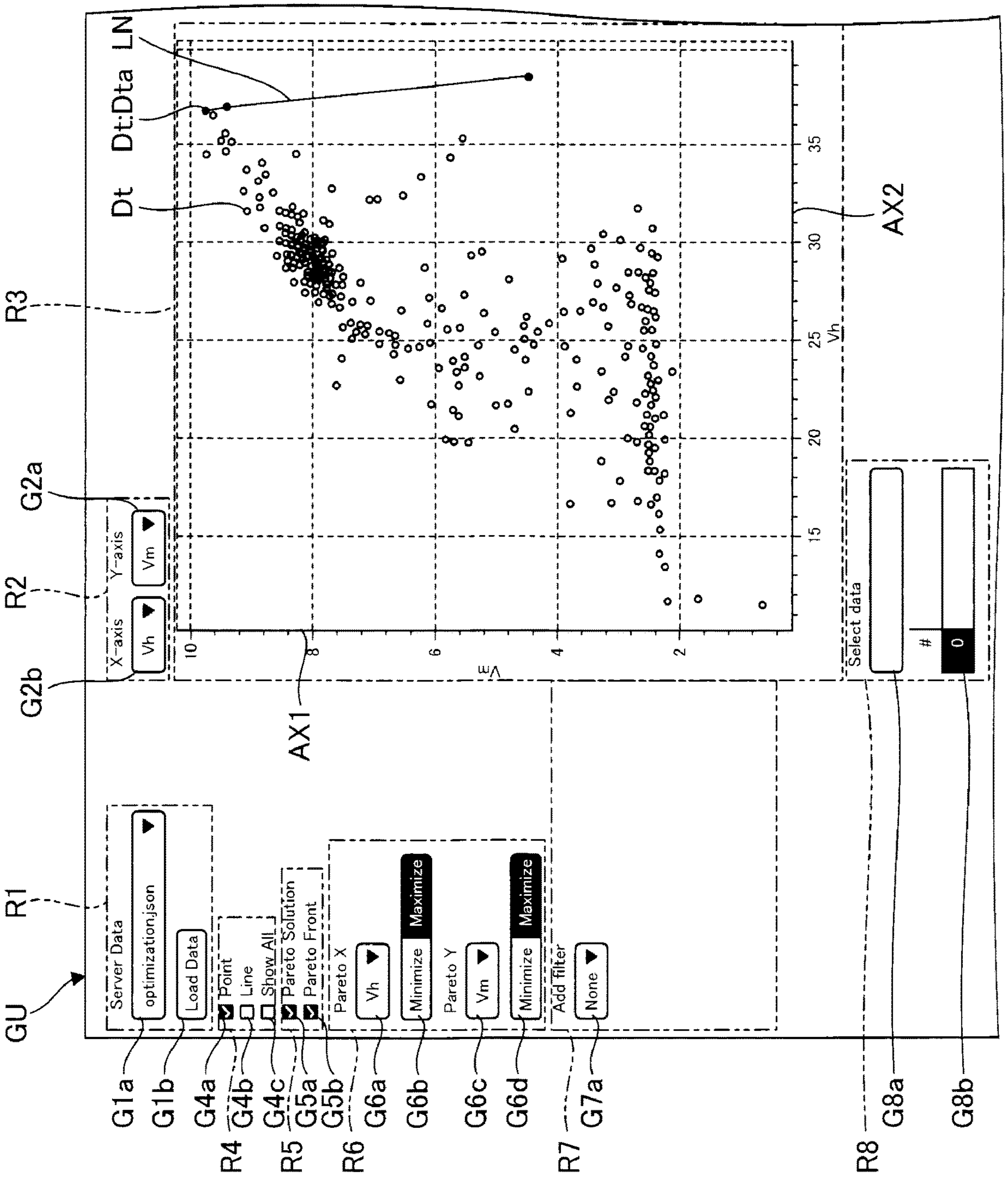
FIG. 8 is a diagram illustrating a display example when changing an objective of Pareto optimal solutions.

FIG. 8 is a diagram illustrating a display example when changing the objective of the Pareto optimal solutions. FIG. 8 illustrates an example in which the state of input to the button G6*b* in the region R6 of the image GU in the above-described state illustrated in FIG. 6 is changed from "minimize" to "maximize".

In the example illustrated in FIG. 8, the states of input to the regions R2, R4, R5, R7, R8, and R9 are the same as those in the above-described example illustrated in FIG. 6. Accordingly, in FIG. 8, the information DC representing the ejection speed Vm as the first evaluation information is associated with the first axis AX1 and the information DC representing the maximum electric potential Vh as the second evaluation information is associated with the second axis AX2 as with FIG. 6 described above.

Here, in the example illustrated in FIG. 8, the "maximize" is selected by the button G6*b*, in the region R6, the maximum electric potential Vh is inputted to the drop-down list G6*a*, the ejection speed Vm is inputted to the drop-down list G6*c*, and the "maximize" is selected by the button G6*d*. Accordingly, the dots Dta displayed in the region R3 indicate the Pareto optimal solutions in which both the maximum electric potential Vh and the ejection speed Vm are maximized in terms of the objective function that adopts the ejection speed Vm and the maximum electric potential Vh as its variables. Meanwhile, the line LN indicates the Pareto front of the Pareto optimal solutions.

As described above, it is possible to perform display promptly by changing the condition of the Pareto optimal solutions.

Figure 9:
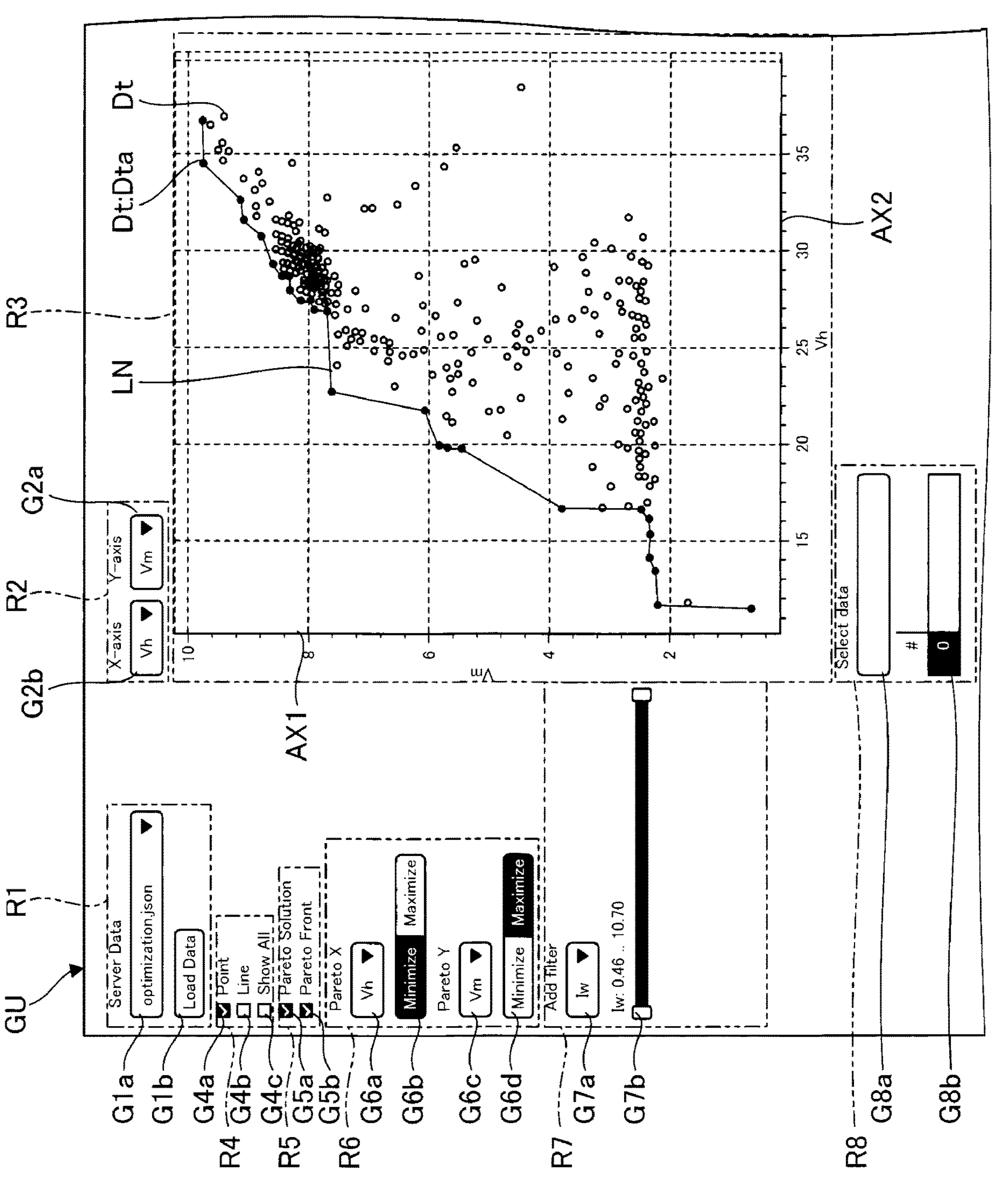
FIG. 9 is a diagram illustrating a display example when receiving input of first condition information.

FIG. 9 is a diagram illustrating a display example when receiving the input of the first condition information. FIG. 9 illustrates an example in which the information DC representing the ejection amount Iw is selected as the first condition information by inputting the ejection amount Iw to the drop-down list G7*a* in the region R7 of the image GU in the above-described state illustrated in FIG. 6.

In the example illustrated in FIG. 9, the states of input to the regions R2, R4, R5, R6, R8, and R9 are the same as those in the above-described example illustrated in FIG. 6. Accordingly, in FIG. 9, the information DC representing the ejection speed Vm as the first evaluation information is associated with the first axis AX1 and the information DC representing the maximum electric potential Vh as the second evaluation information is associated with the second axis AX2 as with FIG. 6 described above.

Here, in the example illustrated in FIG. 9, in the region R7, the slider G7*b* for setting the conditions of the upper limit and the lower limit of the ejection amount Iw comes into being as a consequence of inputting the ejection amount Iw to the drop-down list G7*a*. Here, the upper limit of the ejection amount Iw is set to the maximum value and the lower limit of the ejection amount Iw is set to the minimum value. Accordingly, in the example illustrated in FIG. 9, the contents of display in the region R3 are the same as those in the above-described example illustrated in FIG. 6.

In the case of setting the first condition information as described above, the first display unit 445 performs display corresponding to the candidates for the drive waveform PD satisfying the condition indicated by the first condition information while associating the first evaluation information out of the pieces of information DC with the first axis AX1 and associating the second evaluation information out of the pieces of information DC with the second axis AX2 intersecting with the first axis AX1, respectively.

Figure 10:
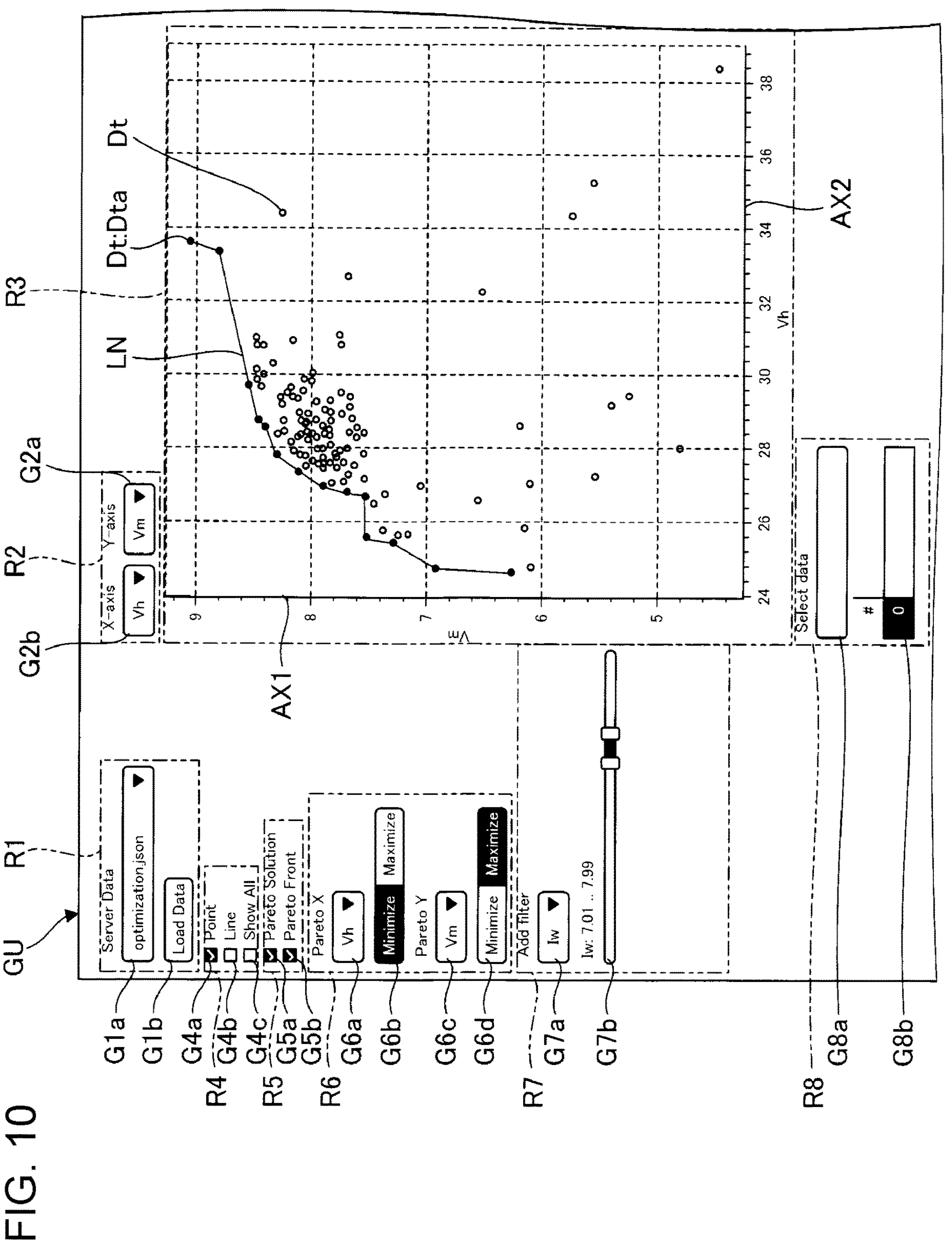
FIG. 10 is a diagram for explaining designation of a condition by a user regarding the first condition information.

FIG. 10 is a diagram for explaining designation of a condition by the user regarding the first condition information. FIG. 10 illustrates an example of a case where the condition of the information DC that represents the ejection amount Iw as the first condition information is designated by operating the slider G7*b* in the region R7 of the image GU in the above-described state illustrated in FIG. 9.

In the example illustrated in FIG. 10, the states of input to the regions R2, R4, R5, R7, R8, and R9 are the same as those in the above-described example illustrated in FIG. 9. Accordingly, in FIG. 10, the information DC representing the ejection speed Vm as the first evaluation information is associated with the first axis AX1 and the information DC representing the maximum electric potential Vh as the second evaluation information is associated with the second axis AX2 as with FIG. 6 described above.

Here, in the example illustrated in FIG. 10, the difference between the upper limit and the lower limit of the slider G7*b* in the region R7 is smaller than that in the example illustrated in FIG. 9. Accordingly, the second reception unit 443 receives the input by the user regarding the first condition information out of the pieces of information DC by receiving the designation of the upper limit and the lower limit regarding the first condition information by the user. For this reason, among the dots Dt illustrated in FIG. 9, the dots Dt not satisfying the condition according to the slider G7*b* are not displayed and the dots Dt satisfying the condition according to the slider G7*b* are displayed in the example illustrated in FIG. 10.

As described above, the second reception unit 443 receives the user's designation of the condition regarding the first condition information by using the slider. In this way, it is possible to cause the user to designate the condition of the first condition information and to change the display in the region R3 based on the result of designation. In the meantime, the first display unit 445 switches between the first evaluation information and the second evaluation information to be displayed following the input to the second reception unit 443 by the user regarding the first condition information.

As understood from FIGS. 9 and 10, according to the present embodiment, the operation of the slider G7*b* also changes the display of the line LN in real time in conjunction with the change of display of the dots Dt.

Figure 11:
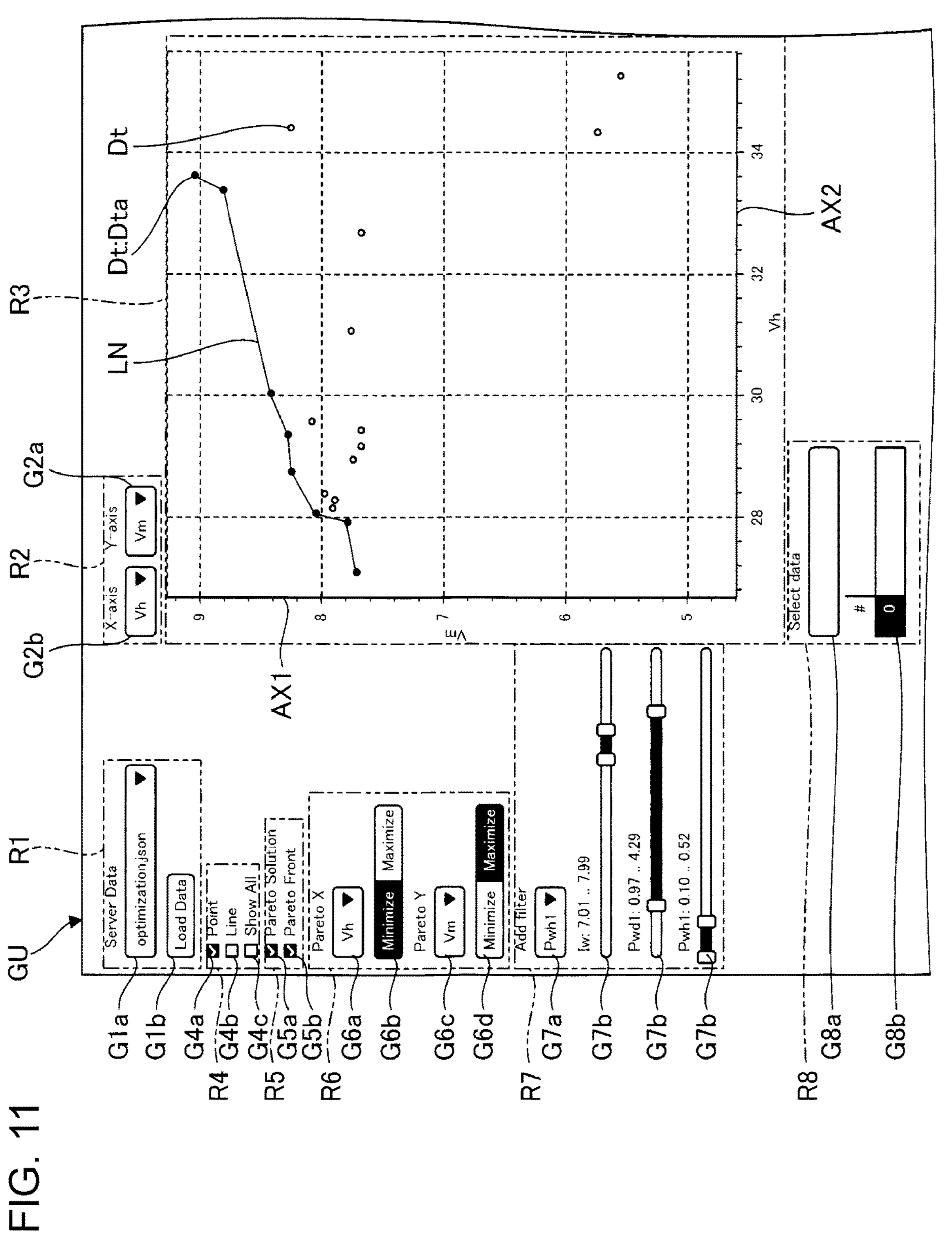
FIG. 11 is a diagram illustrating a display example when receiving input of second condition information.

FIG. 11 is a diagram illustrating a display example when receiving input of the second condition information. FIG. 11 illustrates an example of a case where the values of the first contraction time Pwd1 and the first holding time Pwh1 are additionally inputted to the drop-down list G7*a* in the region R7 of the image GU in the above-described state illustrated in FIG. 10, whereby the information DC representing the first contraction time Pwd1 is selected as the second condition information and the information DC representing the first holding time Pwh1 is selected as third condition information.

In the example illustrated in FIG. 11, the states of input to the regions R2, R4, R5, R6, R8, and R9 are the same as those in the above-described example illustrated in FIG. 6. Accordingly, in FIG. 11, the information DC representing the ejection speed Vm as the first evaluation information is associated with the first axis AX1 and the information DC representing the maximum electric potential Vh as the second evaluation information is associated with the second axis AX2 as with FIG. 6 described above.

Here, in the example illustrated in FIG. 11, the slider G7*b* for setting the condition of the first contraction time Pwd1 and the slider G7*b* for setting the condition of the first holding time Pwh1 come into being besides the slider G7*b* for setting the condition of the ejection amount Iw as a consequence of the additional input of the first contraction time Pwd1 and the first holding time Pwh1 to the drop-down list G7*a* in the region R7. Here, the difference between the upper limit and the lower limit of each slider G7*b* is smaller than a maximum range. For this reason, among the dots Dt illustrated in FIG. 9, the dots Dt not satisfying the conditions according to these sliders G7*b* are not displayed and the dots Dt satisfying the conditions according to these sliders G7*b* are displayed in the example illustrated in FIG. 11.

As described above, the user can designate the conditions of the first condition information, the second condition information, and the third condition information, thereby changing the display in the region R3 based on the results of designation. When setting the first condition and the second condition as mentioned above, the first display unit 445 performs the display corresponding to the drive waveform PD that satisfies both of the condition indicated by the first condition information and the condition indicated by the second condition information.

Figure 12:
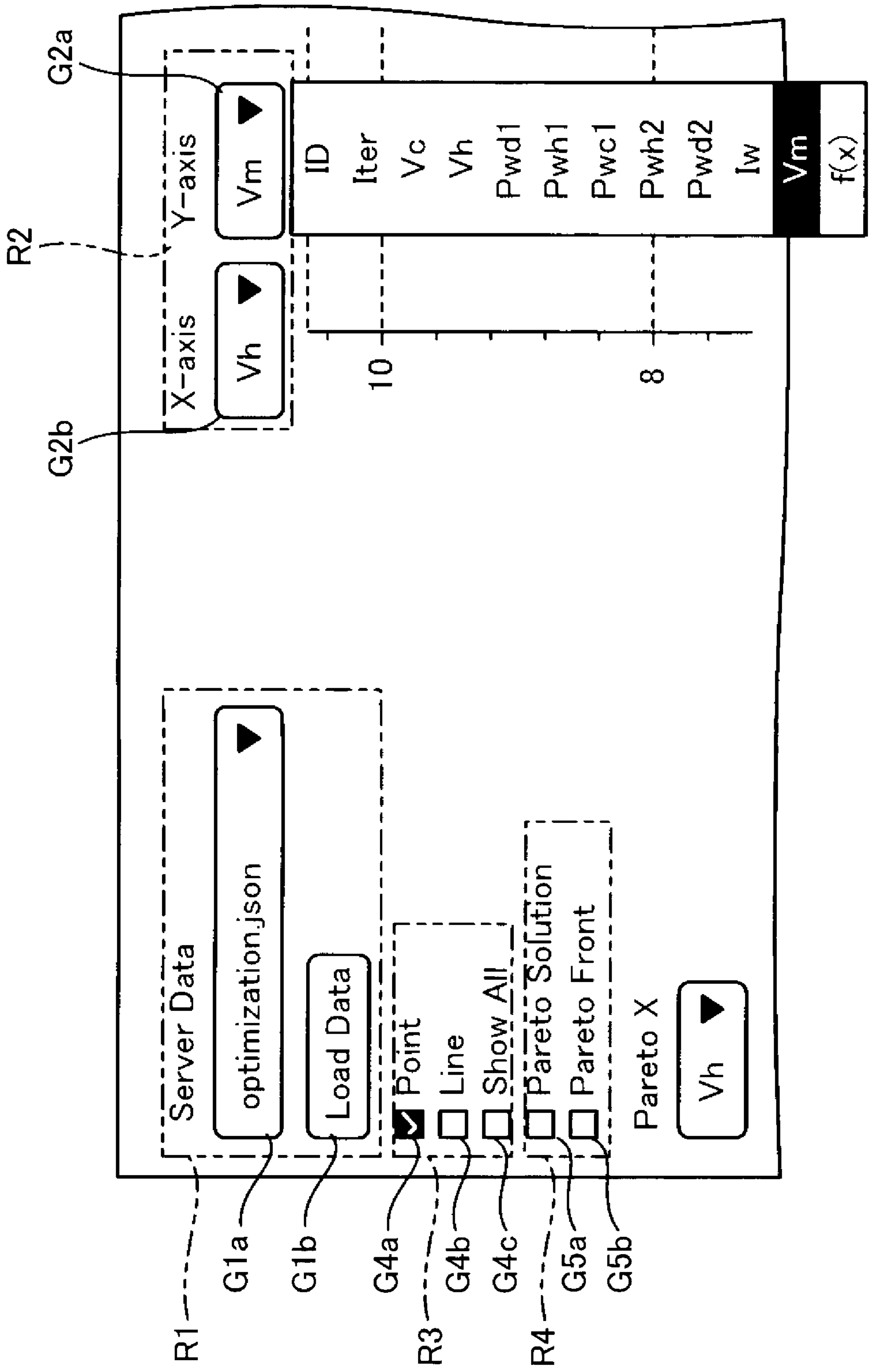
FIG. 12 is a diagram for explaining input of association of information regarding a first axis and a second axis by a first reception unit.

FIG. 12 is a diagram for explaining input of association of the information DC regarding the first axis AX1 and the second axis AX2 by the first reception unit 442. FIG. 12 illustrates an example of the state of input to the drop-down list G2*a* in the region R2.

As illustrated in FIG. 12, a list of the pieces of information DC that can be associated with the first axis AX1 is displayed when an operation such as a click is carried out on the drop-down list G2*a*. In the example illustrated in FIG. 12, the list includes items of an identifier ID, the trial order Iter, the intermediate electric potential Vc, the maximum electric potential Vh, the first contraction time Pwd1, the first holding time Pwh1, the first expansion time Pwc1, the second holding time Pwh2, the second contraction time Pwd2, the ejection amount Iw, the ejection speed Vm, and an objective function f(x). Among these items, one item is selected by an operation such as a click. Based on this input result, the first reception unit 442 carries out the input to associate an arbitrary piece of information DC out of the pieces of information DC with the first axis AX1.

Here, the identifier ID is information for identifying the pieces of information DC from one another, and therefore corresponds to each piece of information DC. The objective function f(x) is an objective function of the Pareto optimization based on the input to the region R6.

As described above, the input for associating the arbitrary piece of information DC out of the pieces of information DC with the first axis AX1 can be carried out by using the drop-down list G2*a*. Although not illustrated, the same list as the aforementioned list is displayed when an operation such as a click is carried out on the drop-down list G2*b*. Then, the first reception unit 442 carries out the input to associate an arbitrary piece of information DC out of the pieces of information DC with the second axis AX2 based on the result of input to the drop-down list G2*b*.

Figure 13:
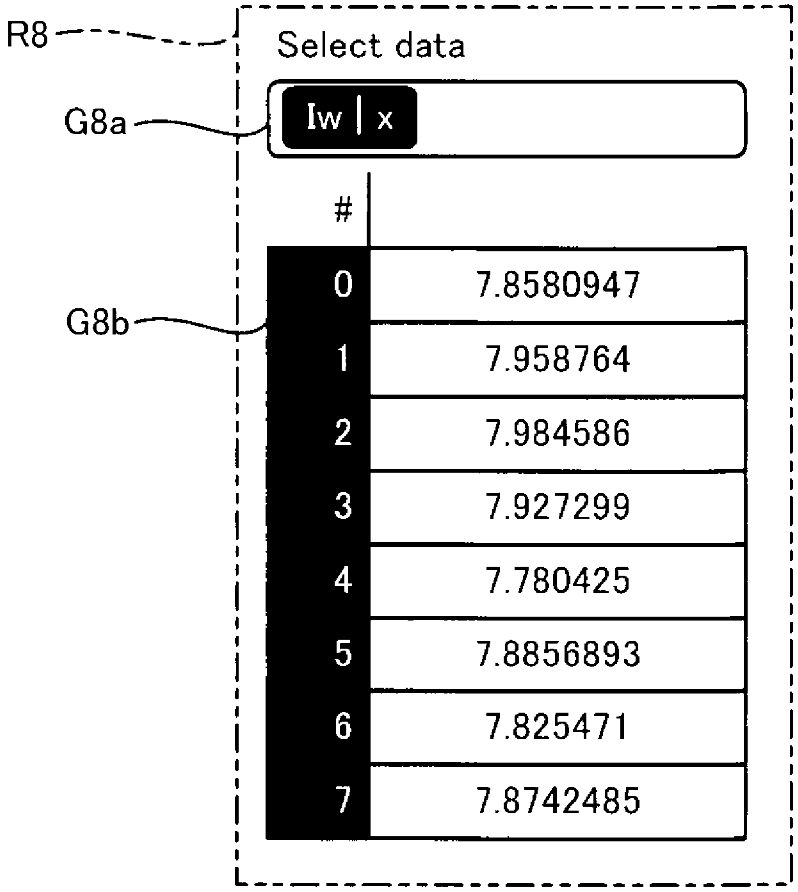
FIG. 13 is a diagram illustrating an example of detailed display of information.

FIG. 13 is a diagram illustrating an example of detailed display of the information DC. FIG. 13 illustrates an example of a case where the ejection amount Iw is inputted to the selection portion G8*a* in the region R8.

As illustrated in FIG. 13, when the ejection amount Iw is inputted to the selection portion G8*a*, information on the ejection amount Iw as the information DC selected with the selection portion G8*a* is displayed on the display portion G8*b* depending on the respective candidates for the drive waveform PD.

Although not illustrated, when the pieces of information DC are inputted to the selection portion G8*a*, the pieces of information DC selected with the selection portion G8*a* are displayed on the display portion G8*b* in a juxtaposed manner depending on the respective candidates for the drive waveform PD.

Figure 14:
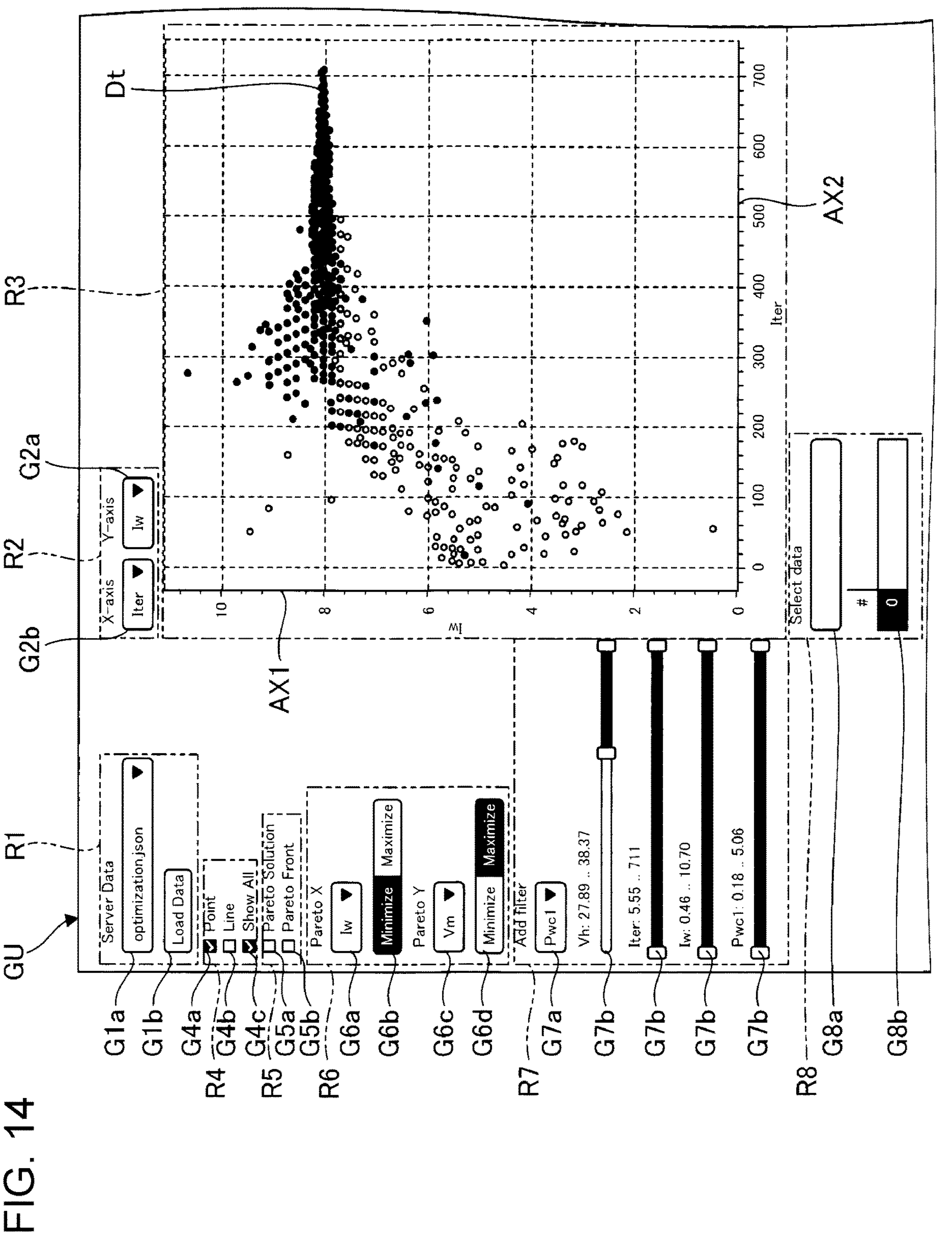
FIG. 14 is a diagram illustrating a display example when different pieces of information are associated with the first axis and the second axis, respectively.

FIG. 14 is a diagram illustrating a display example when different pieces of information DC are associated with the first axis AX1 and the second axis AX2, respectively. FIG. 14 illustrates an example of a case where the information DC representing the ejection amount Iw as the first evaluation information is associated with the first axis AX1 and the information DC representing the trial order Iter as the second evaluation information is associated with the second axis AX2. Here, the drop-down list G2*a* in the region R2 displays the selection of the information DC representing the ejection amount Iw. The drop-down list G2*b* in the region R2 displays the selection of the information DC representing the trial order Iter.

In the example illustrated in FIG. 14, a graph depicting correlations of the candidates for the drive waveform PD in the state of associating the information DC representing the ejection amount Iw as the first evaluation information with the first axis AX1 and associating the information DC representing the trial order Iter as the second evaluation information with the second axis AX2 is displayed in the region R3.

In a search process for the drive waveform PD, the candidates for the drive waveform PD corresponding to the trial order Iter are obtained. In general, in this search process for the drive waveform PD, the candidates for the drive waveform PD are selectively and sequentially applied to the liquid ejection head 210 in such a way that the ejection characteristic approaches a target value. For this reason, the larger the trial order Iter is, the more the information DC corresponding to the candidate for the drive waveform PD is reliable.

Accordingly, in the example illustrated in FIG. 14, the ejection amount Iw gradually converges in accordance with an increase in the trial order Iter in the region R3, thus clarifying the conduct of the above-mentioned search for the drive waveform PD.

Here, in the example illustrated in FIG. 14, The checkboxes G4*a* and G4*c* are selected from the checkboxes G4*a*, G4*b*, and G4*c* in the region R4. Accordingly, the dots Dt indicating relations between the ejection amount Iw and the trial order Iter of the respective candidates are displayed in the region R3 as the display corresponding to the candidates for the drive waveform PD by selecting the checkbox G4*a*. Moreover, as a consequence of selection of the checkbox G4*c*, the dots Dt corresponding to all the candidates for the drive waveform PD are displayed in the region R3 regardless of the presence or absence of the input to the region R7. Nevertheless, the dots Dt that satisfy the condition set in the region R7 and the dots Dt that do not satisfy this condition are displayed in the distinguishable manner. In FIG. 14, the dots Dt not satisfying the condition are indicated with open dots while the dots Dt satisfying the condition are indicated as solid dots for the convenience of illustration.

As described above, the display corresponding to the candidates for the drive waveform PD that satisfy the condition indicated by the first condition information is made in such a way as to be distinguishable from the display corresponding to the candidates for the drive waveform PD that do not satisfy the condition indicated by the first condition information.

Figure 15:
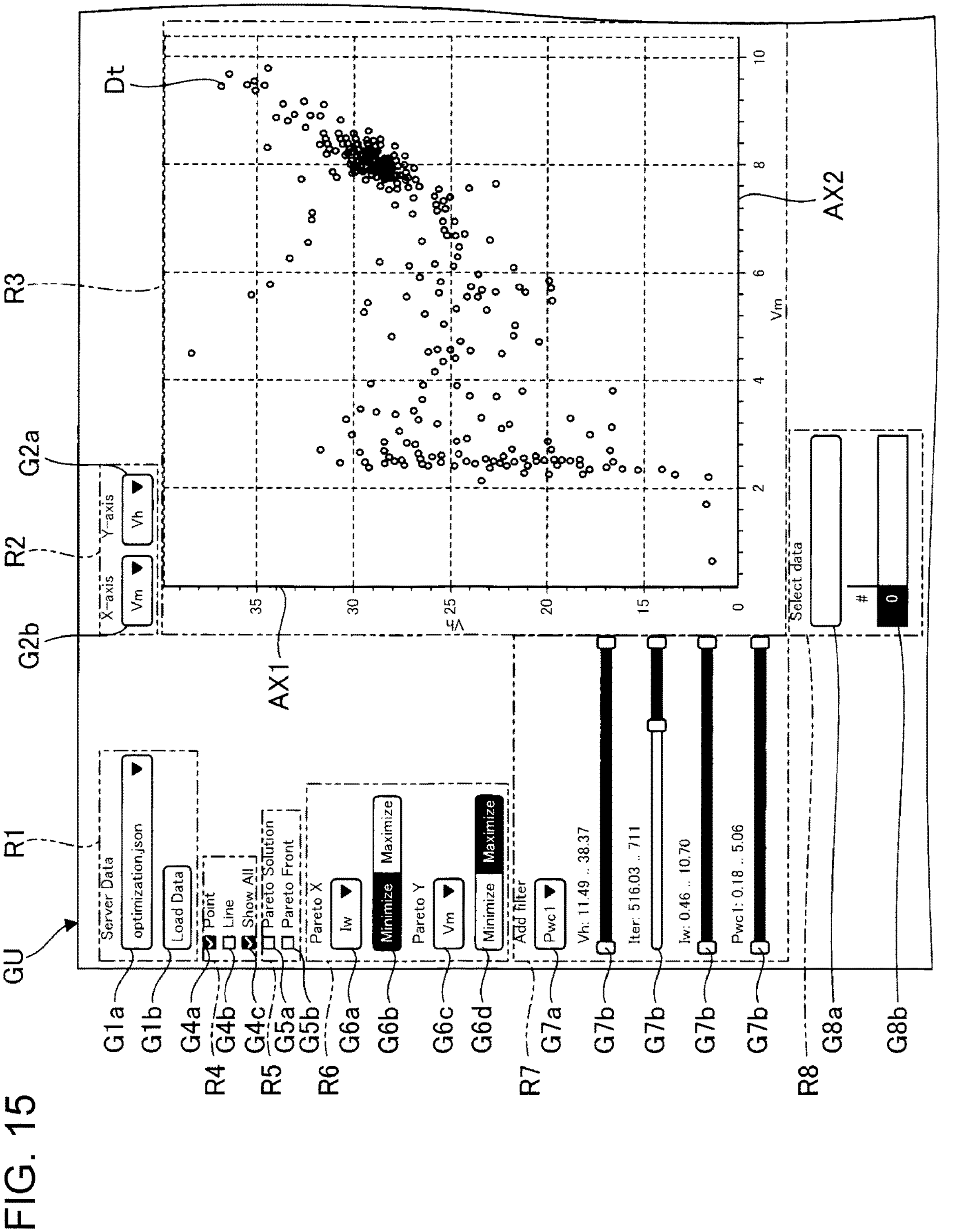
FIG. 15 is a diagram for explaining exchange of the pieces of information to be associated with the first axis and the second axis.

FIG. 15 is a diagram for explaining the exchange of the pieces of information DC to be associated with the first axis AX1 and the second axis AX2. FIG. 15 illustrates an example of a case where the state of input to the drop-down list G2*a* in the region R2 of the image GU in the above-described state illustrated in FIG. 6 is changed from the ejection speed Vm to the maximum electric potential Vh and the state of input to the drop-down list G2*b* therein is changed from the maximum electric potential Vh to the ejection speed Vm. Specifically, FIG. 15 illustrates an example of a case where the information DC representing the maximum electric potential Vh is associated as the second evaluation information with the first axis AX1 and the information DC representing the ejection speed Vm is associated as the first evaluation information with the second axis AX2.

Here, the information DC representing the maximum electric potential Vh is selected by using the drop-down list G2*a* in the region R2, and the information DC representing the ejection speed Vm is selected by using the drop-down list G2*b* in the region R2. In this way, the first reception unit 442 receives the input by the user regarding association of the second evaluation information that is switched from the first evaluation information with the first axis AX1, and association of the first evaluation information that is switched from the second evaluation information with the second axis AX2.

In the example illustrated in FIG. 15, a graph depicting correlations of the candidates for the drive waveform PD in the state of associating the information DC representing the maximum electric potential Vh as the second evaluation information with the first axis AX1 and associating the information DC representing the ejection speed Vm as the first evaluation information with the second axis AX2 is displayed in the region R3.

Here, in the example illustrated in FIG. 15, The checkboxes G4*a* and G4*c* are selected from the checkboxes G4*a*, G4*b*, and G4*c* in the region R4. Accordingly, the dots Dt indicating relations between the maximum electric potential Vh and the ejection speed Vm of the respective candidates are displayed in the region R3 as the display corresponding to the candidates for the drive waveform PD by selecting the checkbox G4*a*. Moreover, as a consequence of selection of the checkbox G4*c*, the dots Dt corresponding to all the candidates for the drive waveform PD are displayed in the region R3 regardless of the presence or absence of the input to the region R7. Nevertheless, the dots Dt that satisfy the condition set in the region R7 and the dots Dt that do not satisfy this condition are displayed in the distinguishable manner. In FIG. 15, the dots Dt not satisfying the condition are indicated with open dots while the dots Dt satisfying the condition are indicated as solid dots for the convenience of illustration.

In the example illustrated in FIG. 15, the sliders G7*b* for setting the conditions of the maximum electric potential Vh, the trial order Iter, the ejection amount Iw, and the first expansion time Pwc1 are displayed in the region R7. Here, as illustrated in FIG. 15, the dots Dt having higher reliability are displayed in a distinguishable manner from other dots Dt by setting a larger lower limit of the trial order Iter.

Figure 16:
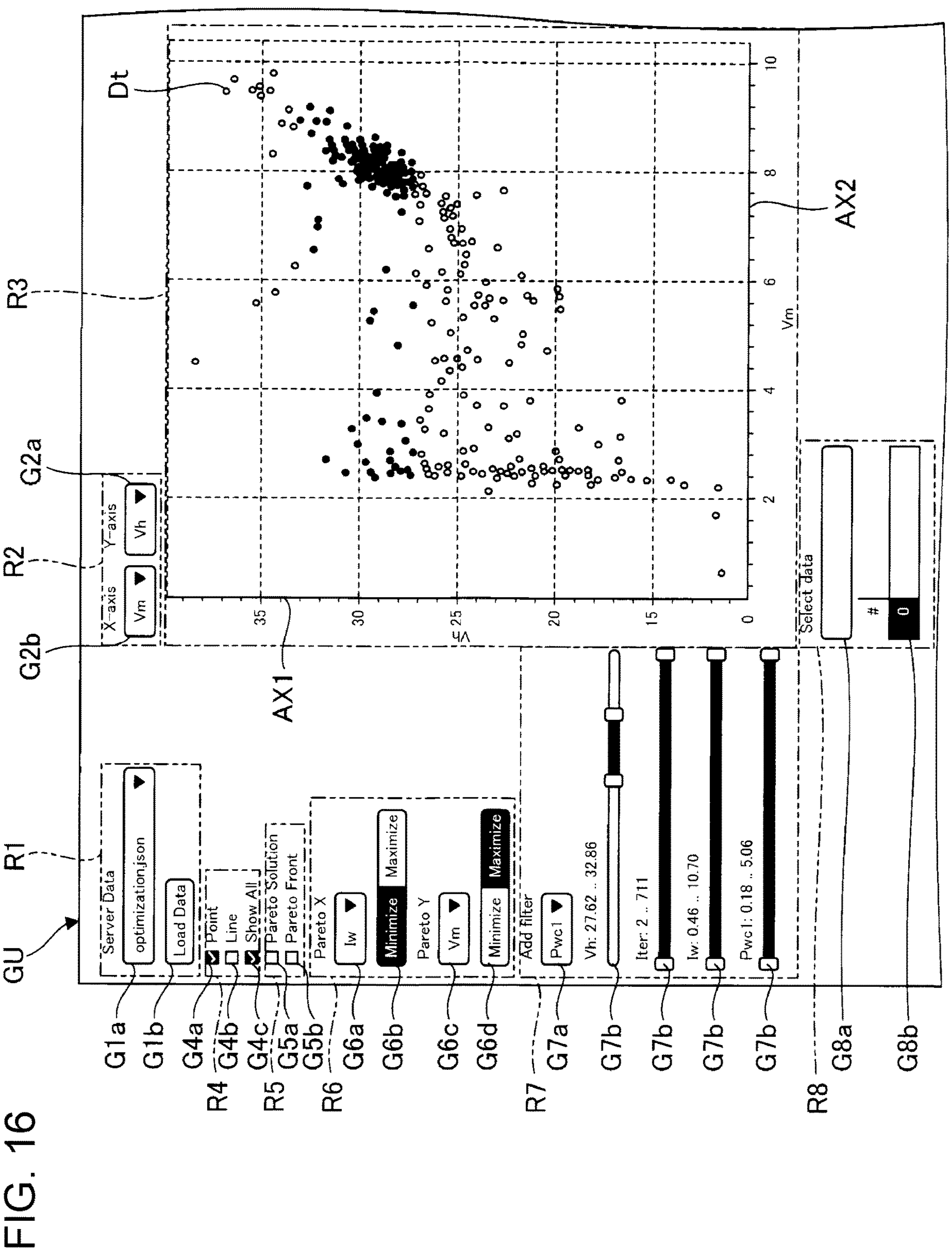
FIG. 16 is a diagram for explaining designation of conditions by the user regarding the first condition information.
Figure 17:
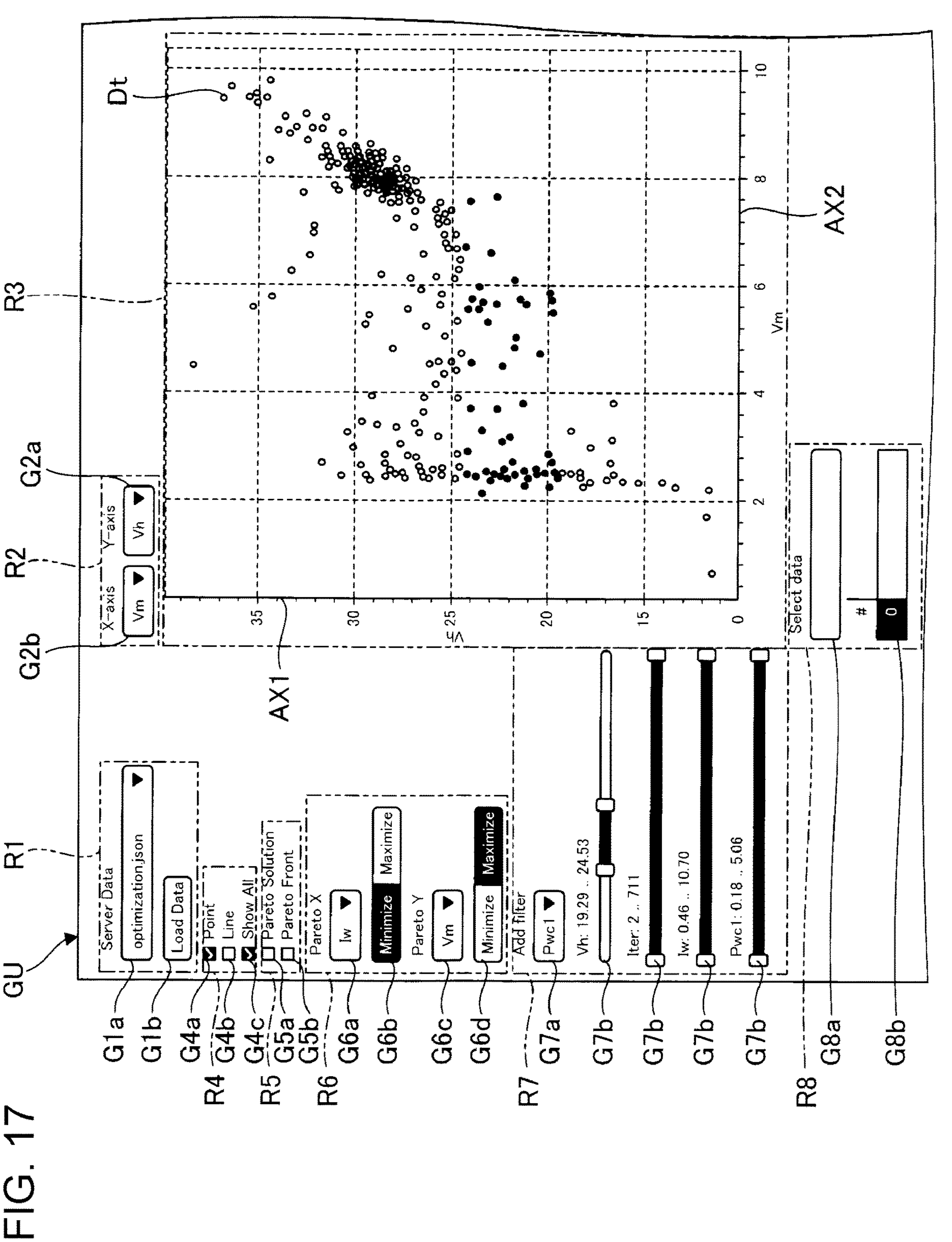
FIG. 17 is another diagram for explaining designation of the conditions by the user regarding the first condition information.

FIGS. 16 and 17 are diagrams for explaining designation of conditions by the user regarding the first condition information. FIGS. 16 and 17 illustrate an example of a case of changing the setting of the slider G7*b* in the region R7 of the image GU in the above-described state illustrated in FIG. 15.

In the example illustrated in FIG. 16, the slider G7*b* for setting the condition of the maximum electric potential Vh out of the sliders G7*b* in the region R7 is set in such a way as to reduce the difference between the upper limit and the lower limit. Here, each of the rest of the sliders G7*b* is set in such a way as to maximize the difference between the upper limit and the lower limit.

Here, by operating the portion between the pair of sliders included in the slider G7*b* for setting the condition of the maximum electric potential Vh, it is possible to move the pair of sliders while retaining the difference between the upper limit and the lower limit as illustrated in FIG. 17, for example. Meanwhile, the dots Dt in the region R3 that indicate satisfaction of the condition set in the region R7 are changed in conjunction with the above-mentioned operation.

As described above, the second reception unit 443 receives the designation by the user in such a way as to change both the upper limit and the lower limit while fixing the difference between the upper limit and the lower limit regarding the first condition information.

Figure 18:
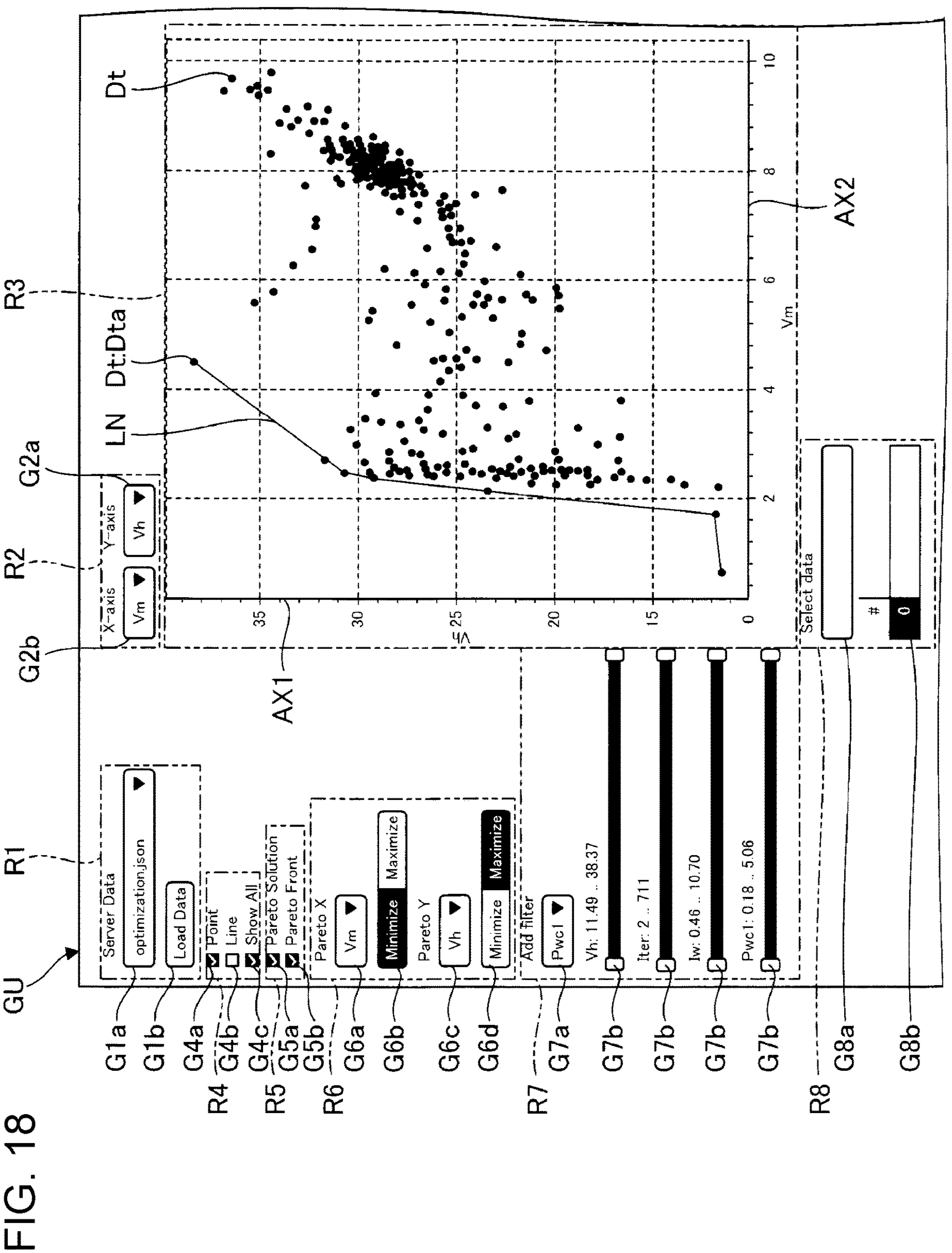
FIG. 18 is a diagram for explaining display switching of Pareto optimal solution information following input by the user regarding the first condition information.
Figure 19:
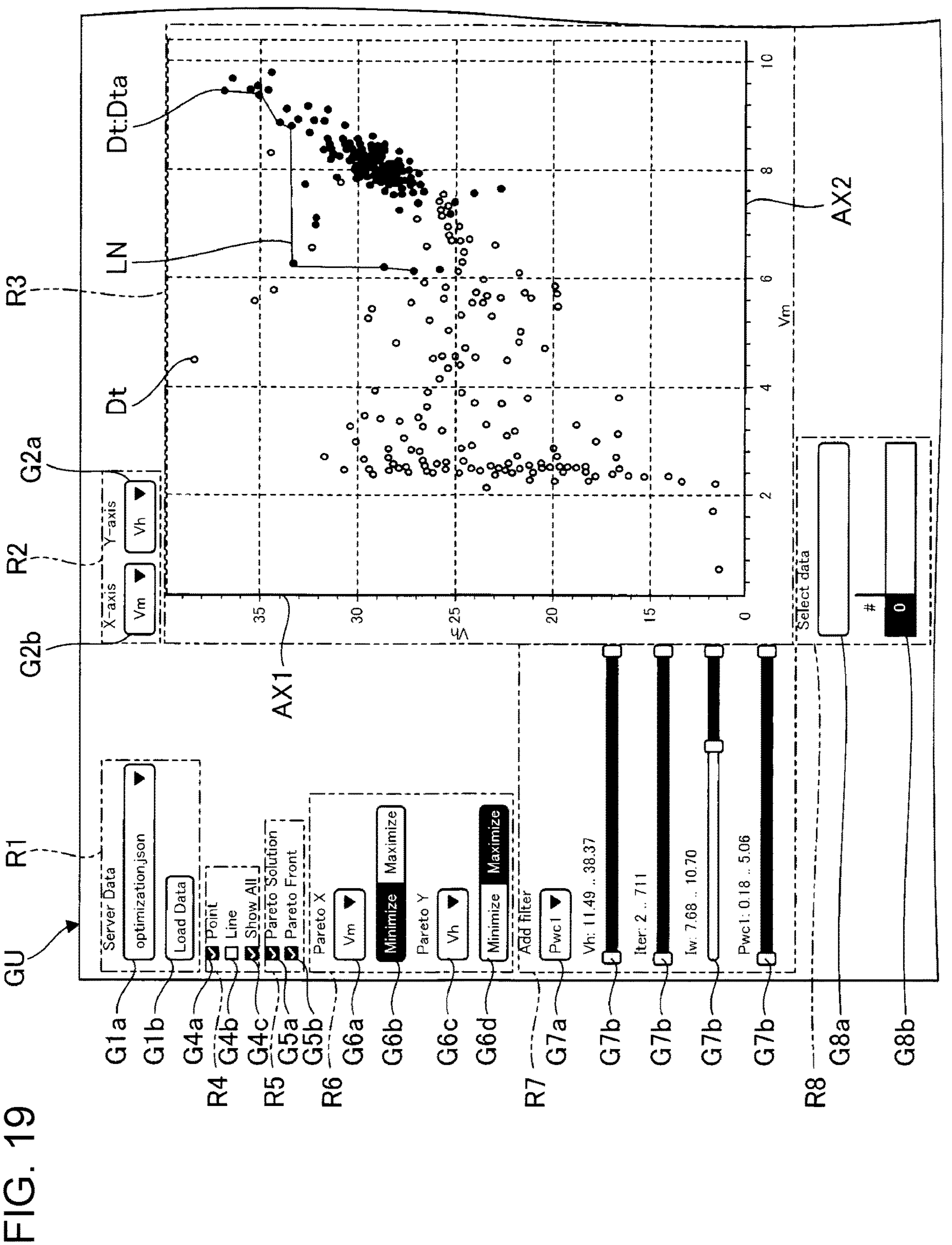
FIG. 19 is another diagram for explaining the display switching of the Pareto optimal solution information following the input by the user regarding the first condition information.

FIGS. 18 and 19 is diagrams for explaining display switching of the Pareto optimal solution information following input by the user regarding the first condition information. FIGS. 18 and 19 illustrate an example of a case of selecting both the checkboxes G5*a* and G5*b* in the region R5 of the image GU in the above-described state illustrated in FIG. 15.

In the example illustrated in FIG. 18, the ejection speed Vm is inputted to the drop-down list G6*a*, "minimize" is selected with the button G6*b*, the maximum electric potential Vh is inputted to the drop-down list G6*c*, and "maximize" is selected with the button G6*d* in the region R6. Accordingly, the dots Dta displayed in the region R3 indicate the Pareto optimal solutions in which the ejection speed Vm is minimized while the maximum electric potential Vh is maximized in terms of the objective function that adopts the ejection speed Vm and the maximum electric potential Vh as its variables. Meanwhile, the line LN indicates the Pareto front of the Pareto optimal solutions.

Here, in the example illustrated in FIG. 18, all the sliders G7*b* in the region R7 are set to the maximum ranges. When the difference between the upper limit and the lower limit of the ejection amount Iw is reduced from this state by operating the slider G7*b* for setting the condition of the ejection amount Iw as illustrated in FIG. 19, for example, the dots Dta and the line LN in the region R3 are changed in conjunction with this operation so as to satisfy the condition set in the region R7.

As described above, the first display unit 445 switches the Pareto optimal solution information to be displayed on the second reception unit 443 following the input by the user regarding the first condition information.

According to the above-described information processing apparatus 400, the acquisition unit 441 acquires the pieces of information DC being different from one another regarding the respective candidates for the drive waveform PD. Thus, it is possible to use the respective candidates for the drive waveform PD obtained in a search process in the past, which can be useful resources. Then, the first reception unit 442 receives the input by the user regarding association of the first evaluation information with the first axis AX1 and association of the second evaluation information with the second axis AX2. Accordingly, it is possible to extract two pieces of information as the first evaluation information and the second evaluation information as desired by the user from the pieces of information DC. Meanwhile, based on the aforementioned association, the first display unit 445 performs the display corresponding to the candidates for the drive waveform PD. Thus, it is possible to perform the display such that the user can easily understand the relation between the first evaluation information and the second evaluation information as the characteristics obtained from the candidates for the drive waveform PD.

In the present embodiment, as described above, the first reception unit 442 further receives the input by the user regarding the action to switch from the piece of information DC as the first evaluation information to the piece of information DC as the third evaluation information out of the pieces of information DC and to associate the third evaluation information with the first axis AX1. As such, it is possible display the relation between the second evaluation information and the third evaluation information as desired by the user.

Meanwhile, as described above, the first reception unit 442 further receives the input by the user regarding an action to switch the information to be associated with the first axis AX1 from the first evaluation information to the second evaluation information, and to switch the information to be associated with the second axis AX2 from the second evaluation information to the first evaluation information. As such, it is possible to display the relation between the first evaluation information and the second evaluation information in the aspect of exchanging the first axis AX1 and the second axis AX2 as desired by the user.

Moreover, as described above, the first display unit 445 performs the display corresponding to the candidates for the drive waveform PD that satisfy the condition indicated by the first condition information after associating the first evaluation information with the first axis AX1 and associating the second evaluation information with the second axis AX2. Thus, the relation between the first evaluation information and the second evaluation information can be displayed as the characteristic obtained by the candidates for the drive waveform PD in such a way as to be easily understood by the user under the condition indicated by the first condition information.

Meanwhile, as described above, the display is not carried in such a way as to correspond to the candidates for the drive waveform PD that do not satisfy the condition indicated by the first condition information. As such, it is possible to display the first condition information in such a way as to be easily understood by the user as compared to the case of performing the display corresponding to the candidates for the drive waveform PD that do not satisfy the condition indicated by the first condition information.

Moreover, as described above, the display corresponding to the candidates for the drive waveform PD that satisfy the condition indicated by the first condition information is made in such a way as to be distinguishable from the display corresponding to the candidates for the drive waveform PD that do not satisfy the condition indicated by the first condition information. As such, it is possible to display the first condition information in such a way as to be easily understood by the user as compared to the case where the former display is not distinguishable from the latter display.

Meanwhile, as described above, the first display unit 445 switches the first evaluation information and the second evaluation information to be displayed following the input by the user to the second reception unit 443 regarding the first condition information. As such, the display on the first display unit 445 can be changed in real time in response to the input by the user.

Moreover, as described above, the second reception unit 443 receives the designation of the upper limit and the lower limit regarding the first condition information by the user. As such, the range of information indicated by the first condition information can be designated as desired by the user.

Meanwhile, as described above, the second reception unit 443 receives the designation by the user in such a way as to change both the upper limit and the lower limit regarding the first condition information in an interlocking manner while fixing the difference between the upper limit and the lower limit. As such, in the case where the difference between the upper limit and the lower limit of the information indicated by the first condition information can be fixed, it is possible to designate the relevant range easily as compared of a mode of individually designating the upper limit and the lower limit, respectively.

Moreover, as described above, the second reception unit 443 receives the designation of the condition by the user regarding the first condition information by using the slider. As such, it is possible to designate the condition by the user regarding the first condition information by a simple operation.

Meanwhile, as described above, the second reception unit 443 further receives the input by the user regarding the second condition information out of the pieces of information DC, which is different from the first condition information. The first display unit 445 performs the display corresponding to the drive waveform PD that satisfies both the condition indicated by the first condition information and the condition indicated by the second condition information. As such, it is possible to provide the user with the display with which the drive waveform PD satisfying both of the conditions indicated by the first condition information and the second condition information can be determined easily.

Moreover, as described above, regarding association of the first evaluation information with the first axis AX1 and association of the second evaluation information with the second axis AX2, the first display unit 445 displays the Pareto optimal solution information concerning the Pareto optimal solutions of the first evaluation information and the second evaluation information after the first display unit 445 performs the display corresponding to the candidates for the drive waveform PD. As such, it is possible to display the optimal solution of the relation between the first evaluation information and the second evaluation information in such a way as to be easily understood by the user as the characteristics obtained from the candidates for the drive waveform PD.

Meanwhile, as described above, the first display unit 445 performs the display as the Pareto optimal solution information such that the plot representing the Pareto optimal solution out of the plots indicating the candidates for the drive waveform PD is distinguishable from other plots. As such, it is possible to display the plot representing the Pareto optimal solution out of the plots indicating the candidates for the drive waveform PD in such a way as to be easily understood by the user.

Moreover, as described above, the first display unit 445 displays the line corresponding to the Pareto optimal solution out of the plots indicating the candidates for the drive waveform PD as the Pareto optimal solution information. As such, it is possible to display the plot representing the Pareto optimal solution out of the plots indicating the candidates for the drive waveform PD in such a way as to be easily understood by the user.

Meanwhile, as described above, there is further provided the third reception unit 444 that receives the selection by the user as to whether or not to display Pareto optimal solution information on the first display unit 445. As such, the relation between the first evaluation information and the second evaluation information can be displayed in such a way as to be understood easily as desired by the user.

Moreover, as described above, the third reception unit 444 receives the selection by the user as to whether the large value or the small value indicated by the first evaluation information is set to the objective in the course of obtaining the Pareto optimal solution. As such, the relation between the first evaluation information and the second evaluation information can be displayed in such a way as to be understood easily as desired by the user.

Meanwhile, as described above, the second reception unit 443 receives the input by the user regarding the first condition information out of the pieces of information DC. The first display unit 445 switches the Pareto optimal solution information to be displayed following the input to the second reception unit 443 by the user regarding the first condition information. As such, it is possible to display the first condition information after extraction of the first condition information as desired by the user.

Moreover, as described above, the pieces of information DC include the waveform information DC1 being the information indicating the waveform components of the candidates for the drive waveform PD. As such, it is possible to display the waveform component of the drive waveform PD.

Meanwhile, as described above, the pieces of information DC include the ejection characteristic information DC2 being the information indicating the ejection characteristics when the candidates for the drive waveform PD are applied to the liquid ejection head 210. As such, it is possible to display the ejection characteristics.

In addition, as described above, the pieces of information DC include the search order information DC3 being the information indicating the order of application of the candidates for the drive waveform PD. As such, it is possible to display the order.

2. Second Embodiment

A second embodiment of the present disclosure will be described below. In the aspect exemplified below, the elements having the same operations and functions as those of the first embodiment will be denoted by the same reference signs used in the description of the first embodiment, and detailed explanations of the respective elements may be omitted as appropriate.

Figure 20:
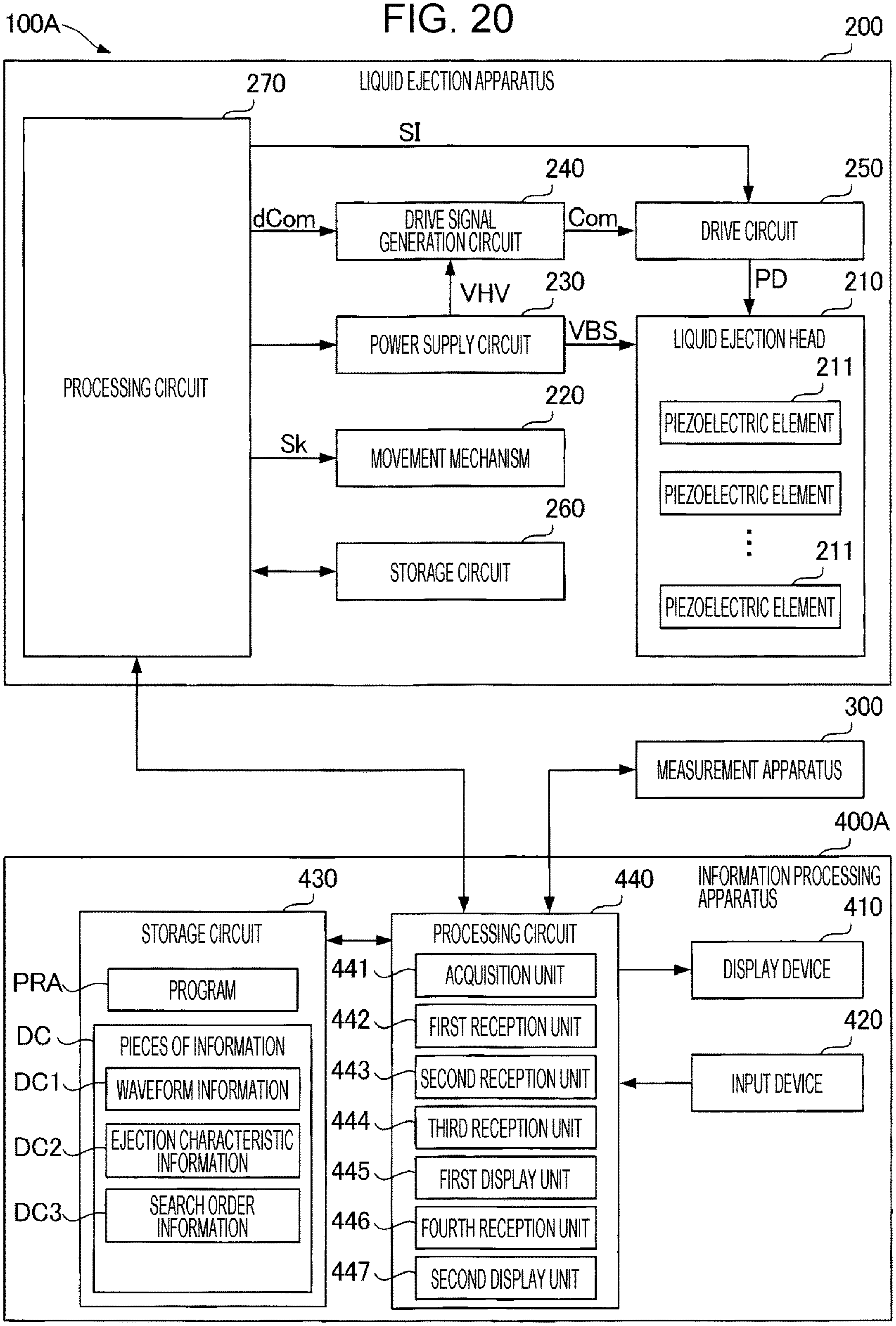
FIG. 20 is a schematic diagram illustrating a configuration example of a system including an information processing apparatus according to a second embodiment.

FIG. 20 is a schematic diagram illustrating a configuration example of a system 100A including an information processing apparatus 400A according to the second embodiment. The system 100A has the same configuration as that of the system 100 of the first embodiment except that the system 100A includes the information processing apparatus 400A instead of the information processing apparatus 400 of the first embodiment. The information processing apparatus 400A has the same configuration as that of the information processing apparatus 400 of the first embodiment except that the information processing apparatus 400A uses programs PRA instead of the programs PR of the first embodiment.

In the information processing apparatus 400A, the processing circuit 440 executes the programs PRA. By executing the programs PRA, the processing circuit 440 functions as a fourth reception unit 446 and a second display unit 447 in addition to the acquisition unit 441, the first reception unit 442, the second reception unit 443, and the first display unit 445. As mentioned above, the information processing apparatus 400A includes the acquisition unit 441, the first reception unit 442, the second reception unit 443, the first display unit 445, the fourth reception unit 446, and the second display unit 447.

The fourth reception unit 446 receives input by the user regarding association of an arbitrary piece of information DC out of the pieces of information DC with an after-mentioned third axis AX3 and association of another arbitrary piece of information DC out of the pieces of information DC with an after-mentioned fourth axis AX4 intersecting with the third axis AX3. Here, the piece of information DC to be associated with the third axis AX3 is an example of "fourth evaluation information" and the piece of information DC to be associated with the fourth axis AX4 is an example of "fifth evaluation information". In other words, the fourth reception unit 446 receives input by the user regarding association of the fourth evaluation information out of the pieces of information DC with the after-mentioned third axis AX3 and association of the fifth evaluation information out of the pieces of information DC with the after-mentioned fourth axis AX4. The piece of the fourth evaluation information and the piece of the fifth evaluation information may be the same piece of information DC. However, the piece of the fourth evaluation information and the piece of the fifth evaluation information are typically different pieces of information DC from each other.

The second display unit 447 controls operations of the display device 410 based on results of reception by the fourth reception unit 446. To be more precise, the second display unit 447 performs display corresponding to the candidates for the drive waveform PD in a state of associating an arbitrary piece of information DC out of the pieces of information DC with the after-mentioned third axis AX3 and associating another arbitrary piece of information DC out of the pieces of information DC with the after-mentioned fourth axis AX4. Accordingly, the second display unit 447 performs display corresponding to the candidates for the drive waveform PD while associating the fourth evaluation information with the third axis AX3 and associating the fifth evaluation information with the fourth axis AX4, for example.

In the present embodiment, the display by the second display unit 447 is carried out in a juxtaposed manner to the display by the above-described first display unit 445.

Figure 21:
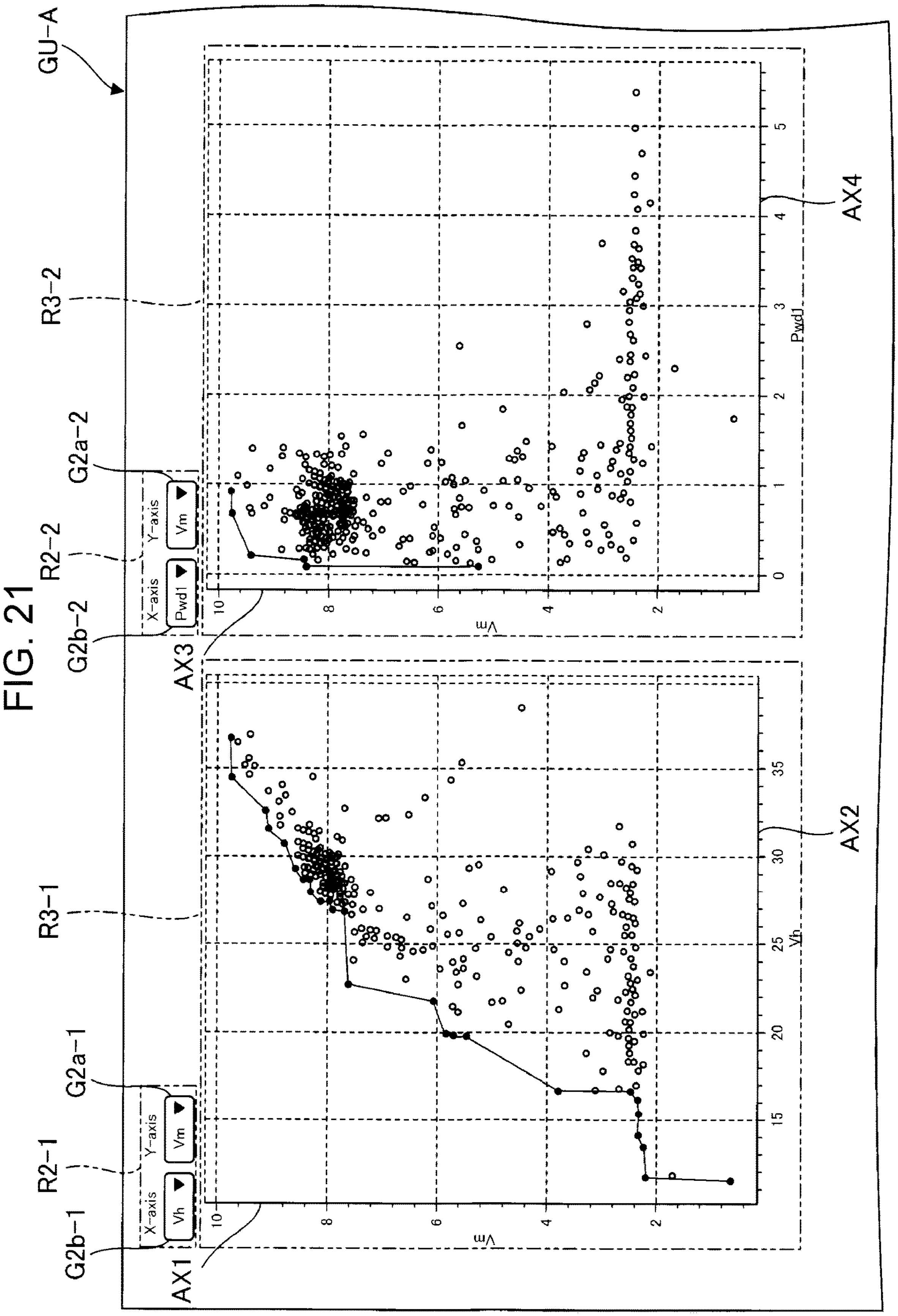
FIG. 21 is a diagram illustrating a display example of fourth evaluation information and fifth evaluation information of the second embodiment.

FIG. 21 is a diagram illustrating a display example of the fourth evaluation information and the fifth evaluation information of the second embodiment. In the present embodiment, the processing circuit 440 of the information processing apparatus 400A executes the programs PRA, thereby causing the display device 410 to display an after-mentioned image GU-A for the GUI as illustrated in FIG. 21.

The image GU-A includes regions R2-1, R2-2, R3-1, and R3-2. Although not illustrated, the image GU-A includes the regions R1, R8, and R9 of the first embodiment, and also includes regions equivalent to the regions R4, R5, R6, and R7 of the first embodiment which correspond to the region R3-1 and the region R3-2, respectively.

The region R2-1 is equivalent to the region R2 of the first embodiment, and includes drop-down lists G2*a*-1 and G2*b*-1 which are equivalent to the drop-down lists G2*a* and G2*b*. The region R3-1 is equivalent to the region R3 of the first embodiment.

In the meantime, the region R2-2 is a region for selecting the pieces of information DC to be associated with the third axis AX3 and the fourth axis AX4, respectively. In the example illustrated in FIG. 21, the region R2-2 includes drop-down lists G2*a*-2 and G2*b*-2. The drop-down list G2*a*-2 is an element for selecting an arbitrary piece of information DC to be associated with the third axis AX3 out of the read pieces of information DC. The fourth reception unit 446 determines the presence or absence of the input of the information DC to be associated with the third axis AX3 based on a result of selection from the drop-down list G2*a*-2, and receives the input of the information DC to be associated with the third axis AX3 when the input is present. The drop-down list G2*b*-2 is an element for selecting an arbitrary piece of information DC to be associated with the fourth axis AX4 out of the read pieces of information DC. The fourth reception unit 446 determines the presence or absence of the input of the information DC to be associated with the fourth axis AX4 based on a result of selection from the drop-down list G2*b*-2, and receives the input of the information DC to be associated with the fourth axis AX4 when the input is present.

The region R3-2 is a region for performing the display corresponding to the candidates for the drive waveform PD in the state of associating the pieces of information DC with the third axis AX3 and the fourth axis AX4, respectively. In the present embodiment, the region R3-2 is disposed in such a manner to be arranged on the right side of the region R3-1. A graph in which the longitudinal axis indicates the third axis AX3 and the lateral axis indicates the fourth axis AX4 is displayed in the region R3-2. Here, dots that indicate the candidates for the drive waveform PD are displayed in the region R3-2 based on the association with the third axis AX3 and the fourth axis AX4. The second display unit 447 displays the dots based on results of input to the regions equivalent to the regions R2, R4, R5, R6, and R7 corresponding to the region R3-2.

According to the above-described second embodiment as well, it is possible to effectively use the candidates for the drive waveform PD used in the process of determining the drive waveform PD in the past. As described above, in the present embodiment, it is possible to extract two pieces of information DC as the fourth evaluation information and the fifth evaluation information as desired by the user from the pieces of information DC. Then, it is possible to perform the display the relation between the fourth evaluation information and the fifth evaluation information as the characteristics obtained from the candidates for the drive waveform PD in such a way as to be easily understood by the user.

In the present embodiment, the display by the first display unit 445 and the display by the second display unit 447 are carried out in the juxtaposed manner as mentioned above. Accordingly, the relation between the first evaluation information and the second evaluation information can easily be compared with the relation between the fourth evaluation information and the fifth evaluation information.

3. Third Embodiment

A third embodiment of the present disclosure will be described below. In the aspect exemplified below, the elements having the same operations and functions as those of the first embodiment will be denoted by the same reference signs used in the description of the first embodiment, and detailed explanations of the respective elements may be omitted as appropriate.

The present embodiment is the same as the above-described second embodiment except that a display mode of the display by the first display unit 445 and the display by the second display unit 447 is different.

Figure 22:
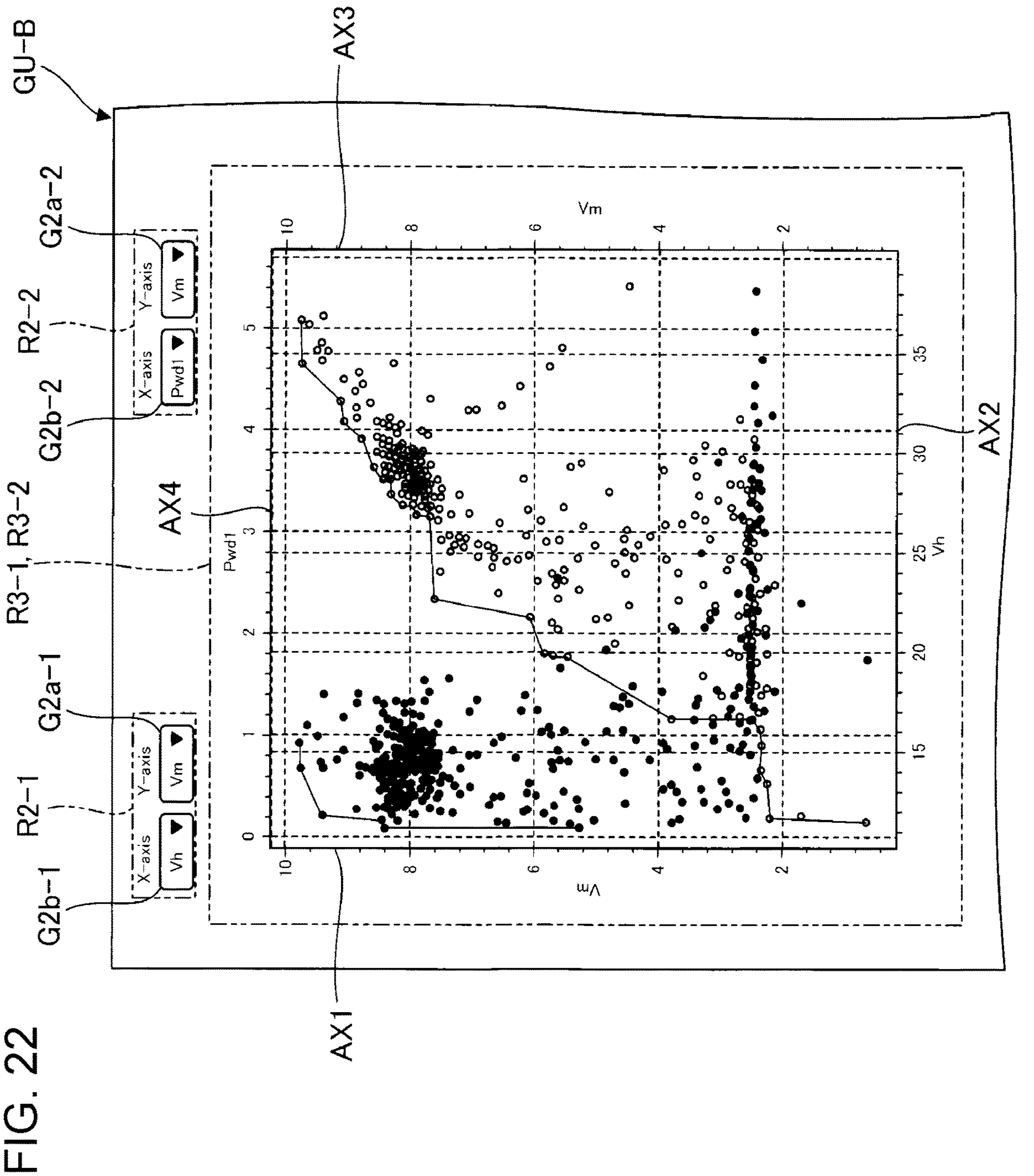
FIG. 22 is a diagram illustrating a display example of the fourth evaluation information and the fifth evaluation information of a third embodiment.

FIG. 22 is a diagram illustrating a display example of the fourth evaluation information and the fifth evaluation information of the third embodiment. In the present embodiment, an image GU-B illustrated in FIG. 22 is displayed on the display device 410. The image GU-B is the same as the image GU-A of the above-described second embodiment except that a layout as well as the display mode of the regions R3-1 and R3-2 are different.

In the present embodiment, the region R3-1 and the region R3-2 are regions overlapping each other. A graph in which the first axis AX1 and the third axis AX3 are arranged on the left and right sides as the longitudinal axes and the second axis AX2 and the fourth axis AX4 are arranged above and below as the horizontal axes is displayed in the overlapping regions.

Here, dots corresponding to the first axis AX1 and the second axis AX2 and dots corresponding to the third axis AX3 and the fourth axis AX4 are displayed in different modes from each other. In FIG. 22, the dots corresponding to the first axis AX1 and the second axis AX2 are indicated with solid dots while the dots corresponding to the third axis AX3 and the fourth axis AX4 are indicated as open dots for the convenience of illustration.

According to the above-described third embodiment as well, it is possible to effectively use the candidates for the drive waveform PD used in the process of determining the drive waveform PD in the past. In the present embodiment, the display by the first display unit 445 and the display by the second display unit 447 are carried out in the overlapping manner as mentioned above. Accordingly, the relation between the first evaluation information and the second evaluation information can easily be compared with the relation between the fourth evaluation information and the fifth evaluation information.

4. Modified Examples

The information processing apparatus of the present disclosure has been described above based on the illustrated embodiments. However, the present disclosure is not limited to these embodiments. Meanwhile, the configurations of the respective portions of the present disclosure can be replaced by arbitrary configurations that exert the same functions as those of the above-described embodiments. It is also possible to add such arbitrary configurations.

4-1. Modified Example 1

The above-described embodiments exemplify the configuration in which the programs PR or PRA are executed by the processing circuit that is provided to the same apparatus as that including the storage circuit to install the programs PR or PRA. However, the present disclosure is not limited to this configuration. The programs PR or PRA may be executed by a processing circuit that is provided in an apparatus that is different from the apparatus including storage circuit to install the programs PR or PRA.

What is claimed is:

1. An information processing apparatus used in order to determine a drive waveform to be applied to a liquid ejection head, comprising:

an acquisition unit that acquires a plurality of pieces of information being different from one another in terms of each of a plurality of candidates for the drive waveform; and a first display unit that performs display corresponding to the candidates for the drive waveform while associating first evaluation information out of the plurality of pieces of information with a first axis and associating second evaluation information out of the plurality of pieces of information with a second axis intersecting with the first axis, respectively, and further displays Pareto optimal solution information concerning Pareto optimal solutions of first Pareto variable information and second Pareto variable information.

2. The information processing apparatus according to claim 1, wherein the first Pareto variable information is identical to the first evaluation information, and the second Pareto variable information is identical to the second evaluation information.

3. The information processing apparatus according to claim 2, wherein the first display unit performs display as the Pareto optimal solution information such that a plot representing the Pareto optimal solution out of plots indicating the candidates for the drive waveform is distinguishable from other plots.

4. The information processing apparatus according to claim 2, wherein the first display unit displays a line corresponding to the Pareto optimal solution out of plots indicating the candidates for the drive waveform as the Pareto optimal solution information.

5. The information processing apparatus according to claim 2, further comprising:

a third reception unit that receives selection by a user as to whether or not to display the Pareto optimal solution information on the first display unit.

6. The information processing apparatus according to claim 5, wherein the third reception unit further receives selection by the user as to whether a large value or a small value indicated by the first evaluation information is set to an objective in obtaining the Pareto optimal solution.

7. The information processing apparatus according to claim 2, further comprising:

a second reception unit that receives input by the user concerning first condition information out of the plurality of pieces of information, wherein the first display unit switches the Pareto optimal solution information to be displayed following the input to the second reception unit by the user regarding the first condition information.

8. The information processing apparatus according to claim 1, wherein the plurality of pieces of information include information indicating waveform components of the candidates for the drive waveform.

9. The information processing apparatus according to claim 1, wherein the plurality of pieces of information include information indicating ejection characteristics when the candidates for the drive waveform are applied to the liquid ejection head.

10. The information processing apparatus according to claim 1, wherein the plurality of pieces of information include information indicating order of application of the candidates for the drive waveform.

* * * * *